(12) United States Patent
Luo et al.

(10) Patent No.: US 10,028,195 B2
(45) Date of Patent: Jul. 17, 2018

(54) DATA FORWARDING CONTROL METHOD AND SYSTEM, CONTROLLER, AND ACCESS DEVICE

(71) Applicant: Huawei Technologies Co., Ltd., Shenzhen, Guangdong (CN)

(72) Inventors: Jun Luo, Shanghai (CN); Jiayin Zhang, Shanghai (CN); Rui Ni, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 81 days.

(21) Appl. No.: 15/256,346

(22) Filed: Sep. 2, 2016

(65) Prior Publication Data

US 2016/0373993 A1   Dec. 22, 2016

Related U.S. Application Data

(63) Continuation of application No. PCT/CN2014/072889, filed on Mar. 5, 2014.

(51) Int. Cl.
*H04W 36/30* (2009.01)
*H04W 8/20* (2009.01)
(Continued)

(52) U.S. Cl.
CPC ............ *H04W 36/30* (2013.01); *H04L 45/00* (2013.01); *H04W 8/18* (2013.01); *H04W 8/20* (2013.01);
(Continued)

(58) Field of Classification Search
CPC ......... H04W 8/18; H04W 8/20; H04W 24/02; H04W 36/00; H04W 36/0083;
(Continued)

(56) References Cited

U.S. PATENT DOCUMENTS 7,633,897 B2 * 12/2009 Bender ................. H04W 8/005
370/310
7,962,605 B2 * 6/2011 Chen ....................... H04L 29/06
709/220
(Continued)

FOREIGN PATENT DOCUMENTS

CN          101127707 A       2/2008
CN          101695168 A       4/2010
(Continued)

OTHER PUBLICATIONS

Carlos Guimaraes et al., "Empowering Software Defined Wireless Networks Through Media Independent Handover Management", Globecom 2013—Next Generation Networking Symposium, Dec. 9, 2013, p. 2204-2209, XP032605205.
(Continued)

*Primary Examiner* — Tri H Phan

(57) ABSTRACT

Embodiments of the present invention provide a data forwarding control method and system, a controller, and an access device. The method includes: after receiving a first control request of a first access point AP, obtaining, by a first controller, a network address of the first AP, where the first control request is used to request the first controller to manage the first AP; sending a network address of a first forwarding device to the first AP, instructing the first AP to send user data to the first forwarding device, sending the network address of the first AP and a predefined data forwarding rule to the first forwarding device, and instructing the first forwarding device to forward the user data of the first AP according to the predefined data forwarding rule. The present invention implements control, by a controller, on AP service data forwarding, and improves a WLAN throughput.

16 Claims, 10 Drawing Sheets

(51) Int. Cl.
*H04W 8/18* (2009.01)
*H04W 36/00* (2009.01)
*H04L 12/701* (2013.01)
*H04W 24/02* (2009.01)

(52) U.S. Cl.
CPC ........ *H04W 36/0083* (2013.01); *H04W 24/02* (2013.01)

(58) Field of Classification Search
CPC .... H04W 36/30; H04W 88/08; H04L 12/701; H04L 12/901; H04L 45/00
See application file for complete search history.

(56) References Cited

U.S. PATENT DOCUMENTS

| | | | |
|---|---|---|---|
| 7,990,915 B2 | 8/2011 | Wang et al. | |
| 9,680,695 B2* | 6/2017 | Cui | H04L 41/0803 |
| 9,755,909 B2* | 9/2017 | Xiong | H04L 41/12 |
| 9,763,151 B2* | 9/2017 | Kim | H04W 36/04 |
| 9,766,967 B2* | 9/2017 | Li | G06F 11/079 |
| 2007/0160014 A1* | 7/2007 | Larsson | H04B 7/022 |
| | | | 370/338 |
| 2007/0183357 A1* | 8/2007 | Bender | H04W 8/005 |
| | | | 370/328 |
| 2011/0249557 A1 | 10/2011 | Malati et al. | |
| 2011/0256880 A1* | 10/2011 | Golaup | H04W 28/08 |
| | | | 455/453 |
| 2012/0192249 A1* | 7/2012 | Raleigh | G06Q 10/06375 |
| | | | 726/2 |
| 2013/0223275 A1 | 8/2013 | Vasseur et al. | |
| 2014/0269535 A1 | 9/2014 | Pazhyannur et al. | |
| 2015/0280927 A1* | 10/2015 | Liang | H04L 45/38 |
| | | | 370/259 |
| 2016/0029271 A1* | 1/2016 | Stenfelt | H04W 48/20 |
| | | | 370/331 |
| 2016/0205598 A1* | 7/2016 | Tian | H04W 48/08 |
| | | | 370/331 |
| 2017/0164419 A1* | 6/2017 | Kim | H04W 76/028 |

FOREIGN PATENT DOCUMENTS

| | | |
|---|---|---|
| CN | 101801002 A | 8/2010 |
| CN | 102196526 A | 9/2011 |
| CN | 103281754 A | 9/2013 |
| WO | 2013127429 A1 | 9/2013 |

OTHER PUBLICATIONS

"OpenFlow Switch Specification, Version 1.4.0", Open Networking Foundation, ONF TS-012, Oct. 14, 2013, 206 pages, XP055235997.
Suneth Namal et al., "Architectural EPC extensions for supporting heterogeneous mobility schemes", www.mevico.org/D22.pdf, Jan. 31, 2013, p. 1-93, XP055227315.

* cited by examiner

DATA FORWARDING CONTROL METHOD AND SYSTEM, CONTROLLER, AND ACCESS DEVICE

CROSS-REFERENCE TO RELATED APPLICATIONS

This application is a continuation of International Patent Application No. PCT/CN2014/072889, filed on Mar. 5, 2014, which is hereby incorporated by reference in its entirety.

TECHNICAL FIELD

The present invention relates to the communications field, and in particular, to a data forwarding control method and system, a controller, and an access device.

BACKGROUND

A wireless local area network (Wireless Local Area Network, WLAN for short) is a quite convenient data transmission system, and implements data transmission by using a radio frequency (Radio Frequency, RF for short) technology according to a relatively simple network architecture.

A common WLAN network architecture includes two modes: a local forwarding mode and a centralized forwarding mode. In the local forwarding mode, a station (Station) is wirelessly connected to an access point (Access Point, AP for short), and the AP accesses the Internet (Internet) by using a router (Router). An access controller (Access controller, AC for short) is disposed on a router side. The AC establishes a control link (a link used to transmit control signaling) to the AP, so as to perform control management on the AP. The AP establishes a data link (a link used to transmit user data) to the Internet by using the router, so as to complete forwarding of service data of the station. A difference between the centralized forwarding mode and the local forwarding mode lies in that in addition to a control management function, a data forwarding function is also performed by using the AC.

In a process of implementing the present invention, the inventor finds that the prior art has at least the following problem: in the local forwarding mode, the AC cannot control service data forwarding; in the centralized forwarding mode, although control of the AC on service data forwarding is implemented, a large data flow has an extremely high requirement for a processing capability of the AC; in addition, the data link and the control link between the AP and the AC are a same link, and therefore, the service data and the control signaling affect each other, which hinders an improvement of a WLAN throughput.

SUMMARY

To implement control on service data forwarding and improve a throughput, the present invention provides a data forwarding control method and system, a controller, and an access device. Technical solutions are as follows:

According to a first aspect, the present invention provides a data forwarding control method, where the method includes:

after receiving a first control request of a first access point AP, obtaining, by a first controller, a network address of the first AP, where the first control request is used to request the first controller to manage the first AP; and sending a network address of a first forwarding device to the first AP, instructing the first AP to send user data to the first forwarding device, sending the network address of the first AP and a predefined data forwarding rule to the first forwarding device, and instructing the first forwarding device to forward the user data of the first AP according to the predefined data forwarding rule.

In a first implementation manner of the first aspect, before the receiving a first control request of a first access point AP, the method further includes:

receiving a discovery request of the first AP, where the discovery request includes a list of neighboring APs of the first AP, and a frequency set of a channel of the first AP at least partially overlaps a frequency set of a channel of a neighboring AP of the first AP; and sending load information and a network address of the first controller to the first AP when a quantity of APs in an AP cluster controlled by the first controller does not exceed a first predefined quantity and/or when a neighboring AP of the first AP exists in the AP cluster controlled by the first controller; and the receiving a first control request of a first access point AP includes:

receiving the first control request, where the first control request is sent after the first AP receives the load information and the network address of the first controller.

In a second implementation manner of the first aspect, the method further includes:

receiving radio resource RR information reported by a second AP, where the RR information includes a quantity of stations associated with the second AP and data load of the second AP, and the second AP belongs to an AP cluster controlled by the first controller; and instructing, when the quantity of stations associated with the second AP exceeds a second predefined quantity and/or when the data load of the second AP exceeds first predefined load, the second AP not to establish an association with a station, except an associated station, that is located in an overlapping coverage area of the second AP and a neighboring AP of the second AP.

With reference to the first aspect and the second implementation manner of the first aspect, in a third implementation manner of the first aspect, the RR information further includes an identifier ID of a neighboring AP, in the AP cluster controlled by the first controller, of the second AP, and includes a frequency set of a channel of the second AP; and the method further includes:

determining a first neighboring AP from neighboring APs of the second AP when the quantity of stations associated with the second AP exceeds the second predefined quantity and/or when the data load of the second AP exceeds the first predefined load, and adjusting a frequency set of a channel of the first neighboring AP to reduce an overlap part of the frequency set of the channel of the second AP and the frequency set of the channel of the first neighboring AP, where a quantity of stations associated with the first neighboring AP does not exceed the second predefined quantity, and data load of the first neighboring AP does not exceed the first predefined load.

With reference to the first aspect and the second implementation manner of the first aspect, in a fourth implementation manner of the first aspect, the instructing, when the quantity of stations associated with the second AP exceeds a second predefined quantity and/or when the data load of the second AP exceeds first predefined load, the second AP not to establish an association with a station, except an associated station, that is located in an overlapping coverage area of the second AP and a neighboring AP of the second AP includes:

receiving a radio resource management RRM request reported by the second AP, where the RRM request is sent after the second AP detects that the quantity of associated stations exceeds the second predefined quantity and/or that the data load of the second AP exceeds the first predefined load; and instructing the second AP not to establish an association with the station, except the associated station, that is located in the overlapping coverage area of the second AP and the neighboring AP of the second AP.

In a fifth implementation manner of the first aspect, the method further includes:

when load on the first controller exceeds second predefined load, sending a network address of a second controller to at least one third AP in an AP cluster controlled by the first controller, and instructing the third AP to exit from the AP cluster controlled by the first controller and to enter an AP cluster controlled by the second controller, where load on the second controller does not exceed the second predefined load.

In a sixth implementation manner of the first aspect, the method further includes:

when the first controller detects that a quantity of times of coordination between a fourth AP in an AP cluster controlled by the first Controller and another AP in the AP cluster is less than a predefined quantity of times, sending a network address of a third controller to the fourth AP, and instructing the fourth AP to exit from the AP cluster controlled by the first controller and to enter an AP cluster controlled by the third controller, where load on the third controller does not exceed second predefined load.

In a seventh implementation manner of the first aspect, the method further includes:

receiving a management request of the first forwarding device, where the management request is sent by the first forwarding device when load on the first forwarding device exceeds third predefined load; and instructing each AP in an AP cluster controlled by the first controller to send user data to a second forwarding device, and controlling the second forwarding device to forward the user data of each AP in the AP cluster controlled by the first controller, where load on the second forwarding device does not exceed the third predefined load.

According to a second aspect, the present invention provides a data forwarding control method, where the method includes:

sending, by an access point AP, a first control request to a first controller, where the first control request is used to request the first controller to manage the AP; and receiving a network address of a first forwarding device that is sent by the first controller, and sending user data to the first forwarding device according to an instruction of the first controller.

In a first implementation manner of the second aspect, before the sending, by an access point AP, a first control request to a first controller, the method further includes:

sending a discovery request to the first controller, where the discovery request includes a list of neighboring APs of the AP, and a frequency set of a channel of the AP at least partially overlaps a frequency set of a channel of a neighboring AP of the AP; and the sending, by an access point AP, a first control request to a first controller includes:

receiving load information and a network address of the first controller that are sent by the first controller, and sending the first control request to the first controller, where the load information and the network address of the first controller are sent to the AP after the first controller receives the discovery request and when a quantity of APs in an AP cluster controlled by the first controller does not exceed a first predefined quantity and/or when a neighboring AP of the AP exists in the AP cluster controlled by the first controller.

In a second implementation manner of the second aspect, the method further includes:

reporting radio resource RR information to the first controller, where the RR information includes a quantity of stations associated with the AP and data load of the AP; and skipping, under an instruction of the first controller, establishing an association with a station, except an associated station, that is located in an overlapping coverage area of the AP and a neighboring AP of the AP, where the instruction of the first controller is delivered to the AP when the quantity of stations associated with the AP exceeds a second predefined quantity and/or when the data load of the AP exceeds first predefined load.

With reference to the second aspect and the second implementation manner of the second aspect, in a third implementation manner of the second aspect, the RR information further includes an identifier ID of a neighboring AP, in an AP cluster controlled by the first controller, of the AP, and a frequency set of a channel of the AP; and after the first controller adjusts a frequency set of a channel of a first neighboring AP of the AP, an overlap part of the frequency set of the channel of the AP and the frequency set of the channel of the first neighboring AP is reduced, where the first controller adjusts the frequency set of the channel of the first neighboring AP when the quantity of stations associated with the AP exceeds the second predefined quantity and/or when the data load of the AP exceeds the first predefined load, the first neighboring AP is determined from neighboring APs of the AP by the first controller, a quantity of stations associated with the first neighboring AP does not exceed the second predefined quantity, and data load of the first neighboring AP does not exceed the first predefined load.

With reference to the second aspect and the second implementation manner of the second aspect, in a fourth implementation manner of the second aspect, the skipping, under an instruction of the first controller, establishing an association with a station, except an associated station, that is located in an overlapping coverage area of the AP and a neighboring AP of the AP includes:

sending a radio resource management RRM request to the first controller after it is detected that the quantity of stations associated with the AP exceeds the second predefined quantity and/or that the data load of the AP exceeds the first predefined load, so that after receiving the RRM request, the first controller instructs the AP not to establish an association with the station, except the associated station, that is located in the overlapping coverage area of the AP and the neighboring AP of the AP; and skipping, under the instruction of the first controller, establishing an association with the station, except the associated station, that is located in the overlapping coverage area of the AP and the neighboring AP of the AP.

In a fifth implementation manner of the second aspect, the method further includes:

according to an instruction delivered by the first controller when load on the first controller exceeds second predefined load, exiting from an AP cluster controlled by the first controller and entering an AP cluster controlled by a second controller, where load on the second controller does not exceed the second predefined load.

In a sixth implementation manner of the second aspect, the method further includes:

according to an instruction delivered by the first controller when the first controller detects that a quantity of times of coordination between the AP and another AP in the AP cluster is less than a predefined quantity of times, exiting from the AP cluster controlled by the first controller and entering an AP cluster controlled by a third controller.

In a seventh implementation manner of the second aspect, the method further includes:

under an instruction of the first controller, sending the user data to a second forwarding device, where load on the first forwarding device exceeds third predefined load, and load on the second forwarding device does not exceed the third predefined load.

According to a third aspect, the present invention provides a controller, where the controller is a first controller, which includes:

an obtaining module, configured to: after receiving a first control request of a first access point AP, obtain a network address of the first AP, where the first control request is used to request the first controller to manage the first AP; and a first sending module, configured to send a network address of a first forwarding device to the first AP, instruct the first AP to send user data to the first forwarding device, send the network address of the first AP and a predefined data forwarding rule to the first forwarding device, and instruct the first forwarding device to forward the user data of the first AP according to the predefined data forwarding rule.

In a first implementation manner of the third aspect, the obtaining module is configured to:

receive a discovery request of the first AP, where the discovery request includes a list of neighboring APs of the first AP, and a frequency set of a channel of the first AP at least partially overlaps a frequency set of a channel of a neighboring AP of the first AP;

send load information and a network address of the first controller to the first AP when a quantity of APs in an AP cluster controlled by the first controller does not exceed a first predefined quantity and/or when a neighboring AP of the first AP exists in the AP cluster controlled by the first controller; and receive the first control request, and obtain the network address of the first AP, where the first control request is sent after the first AP receives the load information and the network address of the first controller.

In a second implementation manner of the third aspect, the controller further includes:

a first receiving module, configured to receive radio resource RR information reported by a second AP, where the RR information includes a quantity of stations associated with the second AP and data load of the second AP, and the second AP belongs to an AP cluster controlled by the first controller; and a first instruction module, configured to instruct, when the quantity of stations associated with the second AP exceeds a second predefined quantity and/or when the data load of the second AP exceeds first predefined load, the second AP not to establish an association with a station, except an associated station, that is located in an overlapping coverage area of the second AP and a neighboring AP of the second AP.

With reference to the third aspect and the second implementation manner of the third aspect, in a third implementation manner of the third aspect, the RR information further includes an identifier ID of a neighboring AP, in the AP cluster controlled by the first controller, of the second AP, and includes a frequency set of a channel of the second AP; and the first instruction module is further configured to:

determine a first neighboring AP from neighboring APs of the second AP when the quantity of stations associated with the second AP exceeds the second predefined quantity and/or when the data load of the second AP exceeds the first predefined load, and adjust a frequency set of a channel of the first neighboring AP to reduce an overlap part of the frequency set of the channel of the second AP and the frequency set of the channel of the first neighboring AP, where a quantity of stations associated with the first neighboring AP does not exceed the second predefined quantity, and data load of the first neighboring AP does not exceed the first predefined load.

With reference to the third aspect and the second implementation manner of the third aspect, in a fourth implementation manner of the third aspect, the first instruction module is configured to:

receive a radio resource management RRM request reported by the second AP, where the RRM request is sent after the second AP detects that the quantity of associated stations exceeds the second predefined quantity and/or that the data load of the second AP exceeds the first predefined load; and instruct the second AP not to establish an association with the station, except the associated station, that is located in the overlapping coverage area of the second AP and the neighboring AP of the second AP.

In a fifth implementation manner of the third aspect, the controller further includes:

a second instruction module, configured to: when load on the first controller exceeds second predefined load, send a network address of a second controller to at least one third AP in an AP cluster controlled by the first controller, and instruct the third AP to exit from the AP cluster controlled by the first controller and to enter an AP cluster controlled by the second controller, where load on the second controller does not exceed the second predefined load.

In a sixth implementation manner of the third aspect, the controller further includes:

a third instruction module, configured to: when the first controller detects that a quantity of times of coordination between a fourth AP in an AP cluster controlled by the first Controller and another AP in the AP cluster is less than a predefined quantity of times, send a network address of a third controller to the fourth AP, and instruct the fourth AP to exit from the AP cluster controlled by the first controller and to enter an AP cluster controlled by the third controller, where load on the third controller does not exceed second predefined load.

In a seventh implementation manner of the third aspect, the controller further includes:

a fourth instruction module, configured to: receive a management request of the first forwarding device, where the management request is sent by the first forwarding device when load on the first forwarding device exceeds third predefined load; and instruct each AP in an AP cluster controlled by the first controller to send user data to a second forwarding device, and control the second forwarding device to forward the user data of each AP in the AP cluster controlled by the first controller, where load on the second forwarding device does not exceed the third predefined load.

According to a fourth aspect, the present invention provides an access point AP, where the access device includes:

a second sending module, configured to send a first control request to a first controller, where the first control request is used to request the first controller to manage the AP; and a second receiving module, configured to receive a network address of a first forwarding device that is sent by the first controller, and send user data to the first forwarding device according to an instruction of the first controller.

In a first implementation manner of the fourth aspect, the second sending module is configured to:

send a discovery request to the first controller, where the discovery request includes a list of neighboring APs of the AP, and a frequency set of a channel of the AP at least partially overlaps a frequency set of a channel of a neighboring AP of the AP; and receive load information and a network address of the first controller that are sent by the first controller, and send the first control request to the first controller, where the load information and the network address of the first controller are sent to the AP after the first controller receives the discovery request and when a quantity of APs in an AP cluster controlled by the first controller does not exceed a first predefined quantity and/or when a neighboring AP of the AP exists in the AP cluster controlled by the first controller.

In a second implementation manner of the fourth aspect, the access device further includes:

a reporting module, configured to report radio resource RR information to the first controller, where the RR information includes a quantity of stations associated with the AP and data load of the AP; and an association module, configured to skip, under an instruction of the first controller, establishing an association with a station, except an associated station, that is located in an overlapping coverage area of the AP and a neighboring AP of the AP, where the instruction of the first controller is delivered to the AP when the quantity of stations associated with the AP exceeds a second predefined quantity and/or when the data load of the AP exceeds first predefined load.

With reference to the fourth aspect and the second implementation manner of the fourth aspect, in a third implementation manner of the fourth aspect, the RR information further includes an identifier ID of a neighboring AP, in an AP cluster controlled by the first controller, of the AP, and a frequency set of a channel of the AP; and after the first controller adjusts a frequency set of a channel of a first neighboring AP of the AP, an overlap part of the frequency set of the channel of the AP and the frequency set of the channel of the first neighboring AP is reduced, where the first controller adjusts the frequency set of the channel of the first neighboring AP when the quantity of stations associated with the AP exceeds the second predefined quantity and/or when the data load of the AP exceeds the first predefined load, the first neighboring AP is determined from neighboring APs of the AP by the first controller, a quantity of stations associated with the first neighboring AP does not exceed the second predefined quantity, and data load of the first neighboring AP does not exceed the first predefined load.

With reference to the fourth aspect and the second implementation manner of the fourth aspect, in a fourth implementation manner of the fourth aspect, the association module is configured to:

send a radio resource management RRM request to the first controller after it is detected that the quantity of stations associated with the AP exceeds the second predefined quantity and/or that the data load of the AP exceeds the first predefined load, so that after receiving the RRM request, the first controller instructs the AP not to establish an association with the station, except the associated station, that is located in the overlapping coverage area of the AP and the neighboring AP of the AP; and skip, under the instruction of the first controller, establishing an association with the station, except the associated station, that is located in the overlapping coverage area of the AP and the neighboring AP of the AP.

In a fifth implementation manner of the fourth aspect, the access device further includes:

a first entering module, configured to: according to an instruction delivered by the first controller when load on the first controller exceeds second predefined load, exit from an AP cluster controlled by the first controller and enter an AP cluster controlled by a second controller, where load on the second controller does not exceed the second predefined load.

In a sixth implementation manner of the fourth aspect, the access device further includes:

a second entering module, configured to: according to an instruction delivered by the first controller when the first controller detects that a quantity of times of coordination between the AP and another AP in the AP cluster is less than a predefined quantity of times, exit from the AP cluster controlled by the first controller and enter an AP cluster controlled by a third controller.

In a seventh implementation manner of the fourth aspect, the access device further includes:

a third sending module, configured to: under an instruction of the first controller, send the user data to a second forwarding device, where load on the first forwarding device exceeds third predefined load, and load on the second forwarding device does not exceed the third predefined load.

According to a fifth aspect, the present invention provides a data forwarding control system, where the system includes a controller, an access device, and a forwarding device, where the controller is the controller described above;

the access device is the access device described above; and the forwarding device is configured to: under control of the controller, receive user data that is sent by the access device controlled by the controller, and forward the received user data according to a predefined data forwarding rule.

Beneficial effects of the technical solutions provided in the present invention are as follows: A first controller manages a first AP, and instructs a first forwarding device to forward user data of the first AP according to a predefined data forwarding rule, which implements control, by the first controller, on forwarding of the user data of the first AP. In addition, the user data is forwarded by the first forwarding device, and a control link between the first controller and the first AP is separated from a data link between the first AP and the first forwarding device, so that control signaling transmitted by using the control link does not affect a data flow transmitted by using the data link, and a data throughput can be improved.

BRIEF DESCRIPTION OF THE DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and persons of ordinary skill in the art may still derive other drawings from these accompanying drawings without creative efforts.

DETAILED DESCRIPTION

To make the objectives, technical solutions, and advantages of the present invention clearer, the following further describes the embodiments of the present invention in detail with reference to the accompanying drawings.

Figure 1:
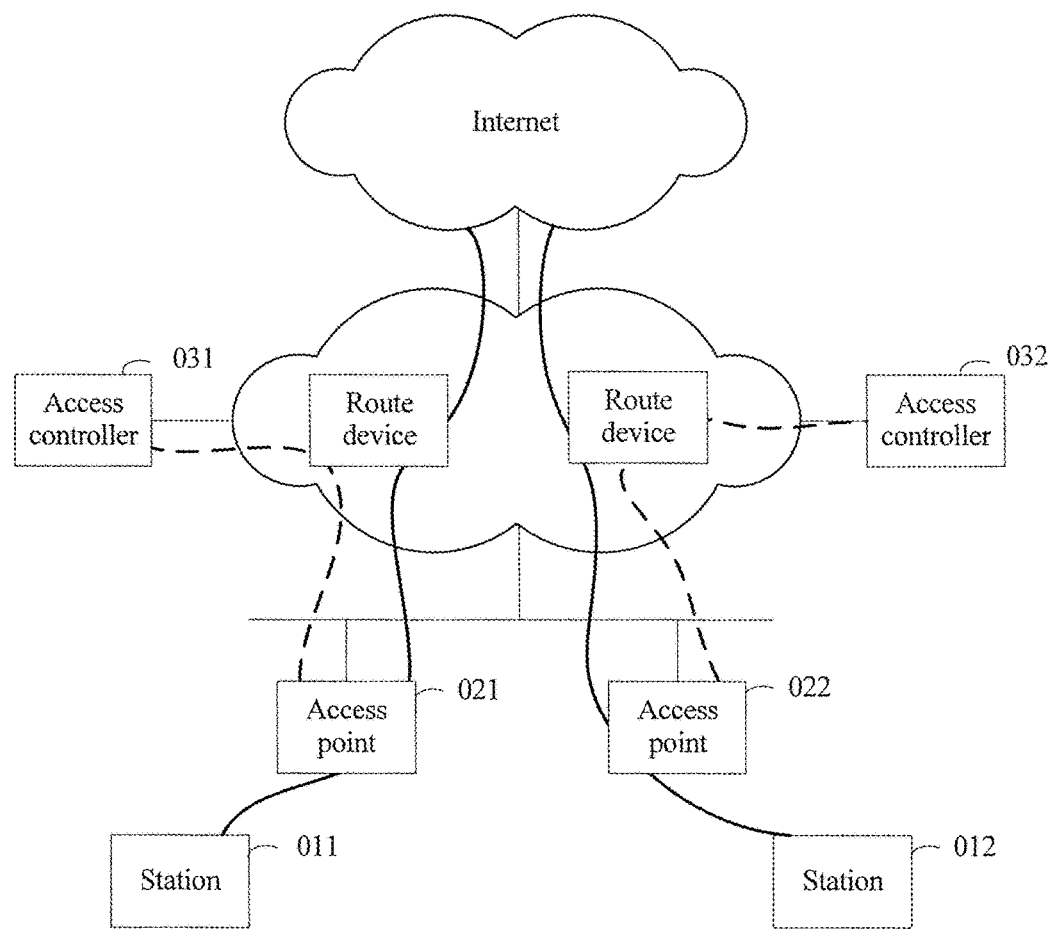
FIG. 1 is a schematic diagram of a WLAN network architecture in a local forwarding mode according to an embodiment of the present invention.

To facilitate understanding of the technical solutions provided in the embodiments of the present invention, a local forwarding mode and a centralized forwarding mode of a WLAN network architecture are first described. A WLAN network architecture shown in FIG. 1 belongs to the local forwarding mode. Referring to FIG. 1, a station 011 is wirelessly connected to an AP 021, and the AP 021 is separately connected to the Internet and an AC 031 by using a route device; a station 012 is wirelessly connected to an AP 022, and the AP 022 is separately connected to the Internet and an AC 032 by using a route device. An AP (including the AP 021 or the AP 022) is responsible for radio access of a station (including the station 011 or the station 012) and service data forwarding (a data forwarding path is indicated by a solid line). An AC (including the AC 031 or the AC 032) controls the AP (including the AP 021 or the AP 022) by using a control link (the control link is indicated by a dashed line) disposed between the AC and the AP (including the AP 021 or the AP 022).

Figure 2:
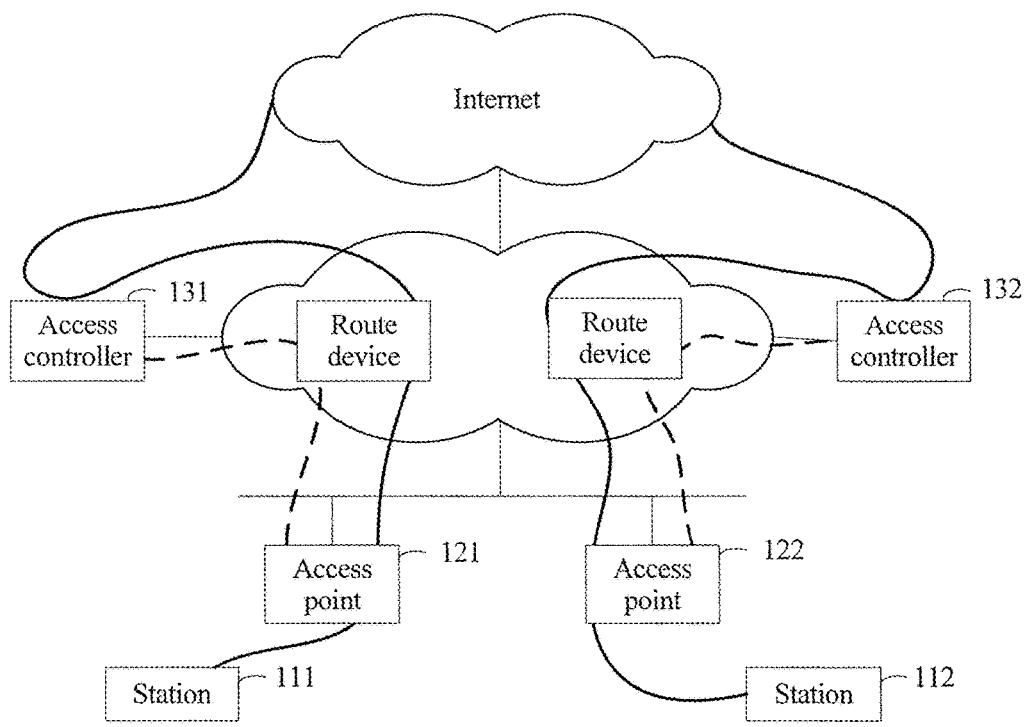
FIG. 2 is a schematic diagram of a WLAN network architecture in a centralized forwarding mode according to an embodiment of the present invention.

A WLAN network architecture shown in FIG. 2 belongs to the centralized forwarding mode. Referring to FIG. 2, a station 111 is wirelessly connected to an AP 121, and the AP 121 is connected to an AC 131 by using a route device; a station 112 is wirelessly connected to an AP 122, and the AP 122 is connected to an AC 132 by using a route device; the AC 131 and the AC 132 are separately connected to the Internet. An AP (including the AP 121 or the AP 122) is responsible for radio access of a station (including the station 111 or the station 112). An AC (including the AC 131 or the AC 132) controls the AP (including the AP 121 or the AP 122) and forwards service data of the station by using a control link (the control link is indicated by a dashed line)/a data link (the data forwarding path is indicated by a solid line) disposed between the AC and the AP (including the AP 121 or the AP 122).

It may be learned from FIG. 1 and FIG. 2 that, in the local forwarding mode and the centralized forwarding mode, a control link occupies a part of a data forwarding path or a data link. In this case, control signaling transmitted by using the control link may affect a service data flow transmitted over the data forwarding path or the data link.

Figure 3:
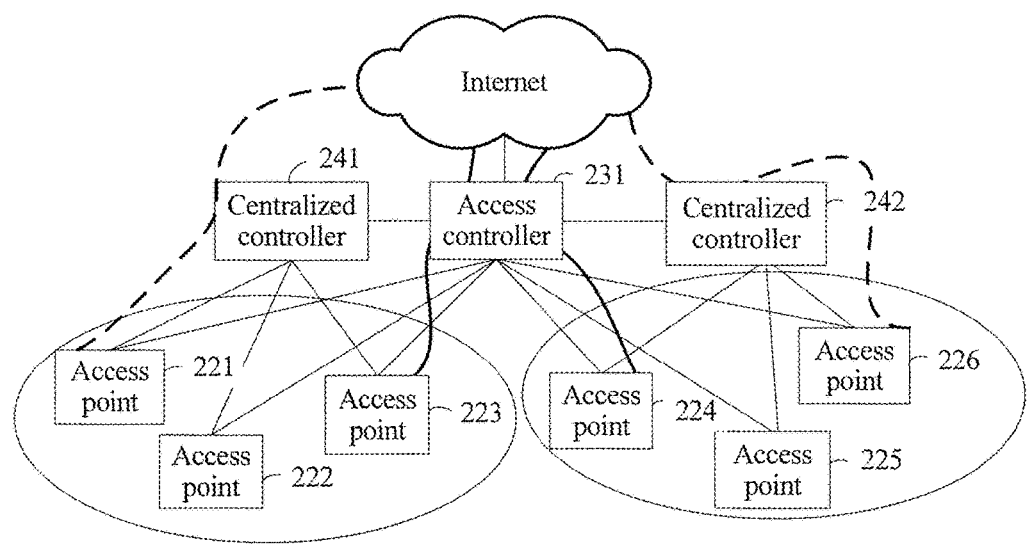
FIG. 3 is a schematic diagram of a WLAN network architecture with a centralized control plane according to an embodiment of the present invention.

FIG. 3 shows a WLAN network architecture with a centralized control plane according to an embodiment of the present invention. As shown in FIG. 3, constituent elements of the WLAN network architecture include constituent elements of the WLAN network architectures shown in FIG. 1 and FIG. 2, for example, an AP and an AC. In addition, the WLAN network architecture further includes a centralized controller (Centralized controller, CC for short). Referring to FIG. 3, APs (including an AP 221, an AP 222, an AP 223, an AP 224, an AP 225, and an AP 226) are wirelessly connected to stations (the stations are not shown in FIG. 3) separately. The APs (including the AP 221, the AP 222, the AP 223, the AP 224, the AP 225, and the AP 226) separately establish data links (as indicated by solid lines) to an AC 231, and the AC 231 is connected to the Internet to complete forwarding of service data. In addition, APs (including the AP 221, the AP 222, and the AP 223) separately establish control links to a CC 241, and the CC 241 performs control management on the APs (including the AP 221, the AP 222, and the AP 223). APs (including the AP 224, the AP 225, and the AP 226) separately establish control links to a CC 242, and the CC 242 performs control management on the APs (including the AP 224, the AP 225, and the AP 226). The AC 231 is further separately connected to CCs (including the CC 241 and the CC 242), and accepts control by the CCs (including the CC 241 and the CC 242). In a first implementation manner, a CC (including a CC 241 or a CC 242) may be a new device. In a second implementation manner, a CC may be an AP among the AP 221, the AP 222, the AP 223, the AP 224, the AP 225, and the AP 226. For example, the CC 241 may be the AP 221, the AP 222, or the AP 223; the CC 242 may be the AP 224, the AP 225, or the AP 226. It should be noted that a communications protocol, such as an OpenFlow (OpenFlow) protocol, between the CCs (including the CC 241 and the CC 242) and the AC 231 meets a protocol specified by SDN (software-defined networking, SDN for short). A communication manner between a CC and an AP may be a communication manner between an AC and an AP in the existing WLAN network architecture. In addition, in FIG. 3, a connection between an AP and an AC, a connection between an AC and the Internet, a connection between a CC and an AP, and a connection between a CC and an AC may be established by using a route device. The WLAN network architecture shown in FIG. 3 can separate a control link from a data forwarding path or a data link. In this way, control signaling transmitted by using the control link does not affect a service data flow transmitted over the data forwarding path or the data link.

Figure 4:
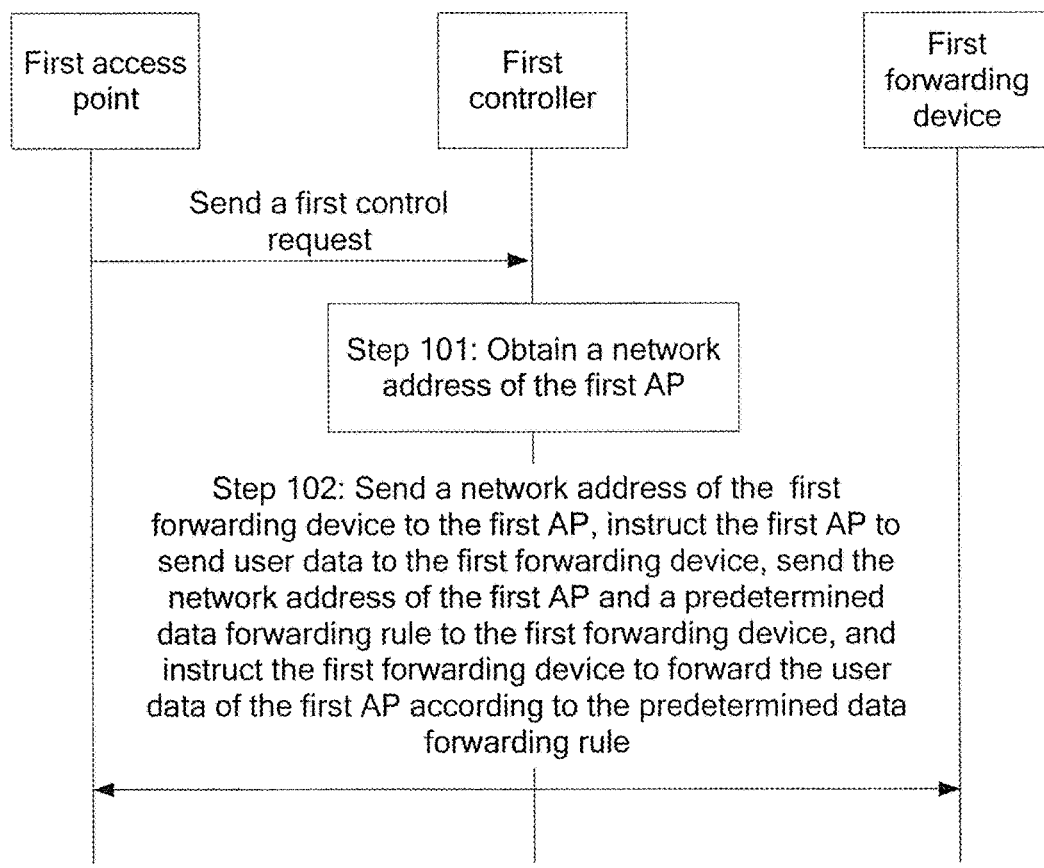
FIG. 4 is a flowchart of a data forwarding control method according to an embodiment of the present invention.

FIG. 4 shows a data forwarding control method according to an embodiment of the present invention, which is applicable to the WLAN network architecture shown in FIG. 3. Referring to FIG. 4, a procedure of the method includes the following steps:

Step 101: After receiving a first control request of a first AP, a first controller obtains a network address of the first AP.

The first control request is used to request the first controller to manage the first AP.

When accessing a WLAN, the first controller obtains a network address of a first forwarding device, and performs control management on the first forwarding device.

After obtaining the network address of the first AP, the first controller adds the first AP to an AP cluster controlled by the first controller. The AP cluster controlled by the first controller may be a set of APs managed by the first controller.

Step 102: The first controller sends a network address of a first forwarding device to the first AP, instructs the first AP to send user data to the first forwarding device, sends the network address of the first AP and a predefined data forwarding rule to the first forwarding device, and instructs the first forwarding device to forward the user data of the first AP according to the predefined data forwarding rule.

The user data of the first AP includes data that is sent by a station to the first AP.

In this embodiment of the present invention, a first controller manages a first AP, and instructs a first forwarding device to forward user data of the first AP according to a predefined data forwarding rule, which implements control, by the first controller, on forwarding of the user data of the first AP. In addition, the user data is forwarded by the first forwarding device, and a control link between the first controller and the first AP is separated from a data link between the first AP and the first forwarding device, so that control signaling transmitted by using the control link does not affect a data flow transmitted by using the data link, a WLAN data throughput can be improved, and WLAN control reliability is improved.

Figure 5:
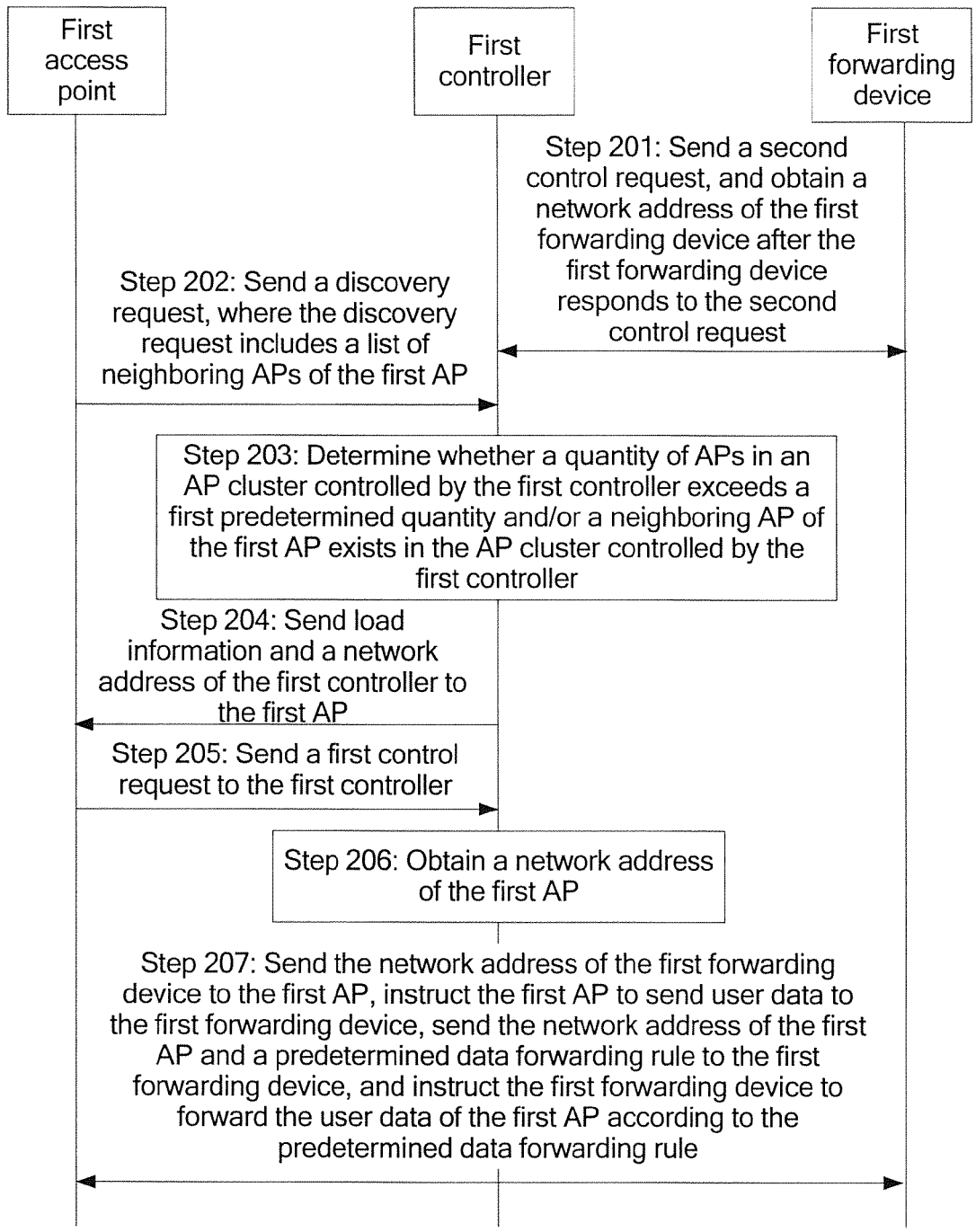
FIG. 5 to FIG. 8 are a flowchart of another data forwarding control method according to an embodiment of the present invention.

FIG. 5 shows a data forwarding control method according to an embodiment of the present invention, which is applicable to the WLAN network architecture shown in FIG. 3. Referring to FIG. 5, a procedure of the method includes the following steps:

Step 201: When accessing a WLAN, a first controller sends a second control request to a first forwarding device, and obtains a network address of the first forwarding device after the first forwarding device responds to the second control request.

The second control request is used by a controller to request to manage a forwarding device, and the first forwarding device may respond to the second control request when load on the first forwarding device does not exceed third predefined load.

In an embodiment, before the first controller accesses the WLAN, a network address of at least one forwarding device may be manually set in the first controller. When accessing the WLAN, the first controller selects a network address of a forwarding device from the set network address of the at least one forwarding device, and uses the selected forwarding device as the first forwarding device and sends the second control request. Alternatively, the first controller sends the second control request to each forwarding device according to the set network address of the at least one forwarding device. The set network address of the at least one forwarding device may be a multicast address. When at least two forwarding devices respond to the second control request, the first controller selects one forwarding device from the at least two forwarding devices as the first forwarding device, and obtains the network address of the first forwarding device.

In another embodiment, after accessing the WLAN, the first controller may search for a closest forwarding device in an addressing manner, and use the found forwarding device as the first forwarding device and send the second control request.

Optionally, load on a forwarding device may refer to a quantity of APs that send user data to the forwarding device, that is, a total quantity of APs that need the forwarding device to forward user data. Alternatively, load on a forwarding device may refer to a total amount of user data sent by an AP that is received within a specific time period. After receiving the second control request, the first forwarding device determines whether the load on the first forwarding device exceeds the third predefined load. If the load on the first forwarding device does not exceed the third predefined load, the first forwarding device responds to the second control request and accepts control management by the first controller.

Optionally, the first controller may be the CC 241 or the CC 242 in FIG. 3, and the first forwarding device may be the AC 231 in FIG. 3. In this embodiment, it is assumed that the first controller is the CC 241, and the first forwarding device is the AC 231.

Step 202: When accessing the WLAN, a first AP sends a discovery request to at least one controller, where the discovery request includes a list of neighboring APs of the first AP, and the at least one controller includes the first controller.

A frequency set of a channel of the first AP at least partially overlaps a frequency set of a channel of a neighboring AP of the first AP. It is assumed that the frequency set of the channel of the first AP is {2.412 GHz, 2.437 GHz, 2.462 GHz}, and the frequency set of the channel of the neighboring AP of the first AP is {2.412 GHz, 2.437 GHz, 2.462 GHz, 5.180 GHz, 5.200 GHz, 5.22 GHz}. An overlap part of the frequency set of the channel of the first AP and the frequency set of the channel of the neighboring AP of the first AP is {2.412 GHz, 2.437 GHz, 2.462 GHz}.

Optionally, before the first AP accesses the WLAN, a network address of the at least one controller may be manually set in the first AP, where the at least one controller includes the first controller. When accessing the WLAN, the first AP selects a network address of a controller from the set network address of the at least one controller, and uses the selected controller as the first controller and sends the discovery request. Alternatively, the first AP sends the discovery request to each controller according to the set network address of the at least one controller. The set network address of the at least one controller may be a multicast address.

Optionally, when the first controller is the CC 241 in FIG. 3, the first AP may be the AP 221, the AP 222, or the AP 223 in FIG. 3; when the first controller is the CC 242 in FIG. 3, the first AP may be the AP 224, the AP 225, or the AP 226 in FIG. 3. In this embodiment, it is assumed that the first AP is the AP 222. Both the AP 222 and the CC 241 access the WLAN. When the CC 241 accesses the WLAN, the AP 222 sends the discovery request to the CC 241, that is, the AP 222 is the first AP to send a discovery request to the CC 241.

Optionally, information that carries the discovery request may be in a format of a discovery request message that is defined in an existing WLAN standard.

Step 203: The first controller receives the discovery request, and determines whether a quantity of APs in an AP cluster controlled by the first controller exceeds a first predefined quantity and/or whether a neighboring AP of the first AP exists in the AP cluster controlled by the first controller.

When the quantity of APs in the AP cluster controlled by the first controller does not exceed the first predefined quantity and/or when a neighboring AP of the first AP exists in the AP cluster controlled by the first controller, step 204 is executed; when the quantity of APs in the AP cluster controlled by the first controller exceeds the first predefined quantity and/or when a neighboring AP of the first AP does not exist in the AP cluster controlled by the first controller, no response is made to the discovery request.

The AP cluster controlled by the first controller may be a set of APs managed by the first controller.

Step 204: The first controller responds to the discovery request of the first AP, and sends load information and a network address of the first controller to the first AP.

Optionally, the load information may include the quantity of APs in the AP cluster controlled by the first controller. In this embodiment, because the AP 222 is the first AP to send the discovery request to the CC 241, when the discovery request is received, a quantity of APs in an AP cluster controlled by the CC 241 is 0.

Step 205: The first AP sends a first control request to the first controller, where the first control request is used to request a controller to manage an AP.

Optionally, in step 202, if the first AP sends the discovery request to at least two controllers, when at least two controllers respond to the discovery request, the first AP may select, according to load information returned by the controllers, a controller (it is assumed that the selected controller is the first controller) that has smaller load from the at least two controllers that make responses, and send the first control request to the selected controller.

Step 206: After receiving the first control request of the first AP, the first controller obtains a network address of the first AP.

The first controller may obtain the network address of the first AP according to the first control request, where the first control request carries the network address of the first AP. Alternatively, when receiving the discovery request of the first AP, the first controller records the network address of the first AP. When receiving the first control request of the first AP, the first controller obtains the recorded network address of the first AP.

After obtaining the network address of the first AP, the first controller adds the first AP to the AP cluster controlled by the first controller.

By using step 202 to step 206, it is implemented that after receiving the first control request of the first AP, the first controller obtains the network address of the first AP, and adds the first AP to the AP cluster controlled by the first controller.

In this embodiment, after the CC 241 adds the AP 222 to the AP cluster controlled by the CC 241, the quantity of APs in the AP cluster controlled by the CC 241 is 1.

It should be noted that this embodiment sets no limitation on an execution sequence of step 201 and step 202, and step 202 may be executed before step 201, or step 202 and step 201 may be executed at the same time.

Step 207: The first controller sends the network address of the first forwarding device to the first AP, instructs the first AP to send user data to the first forwarding device, sends the network address of the first AP and a predefined data forwarding rule to the first forwarding device, and instructs the first forwarding device to forward the user data of the first AP according to the predefined data forwarding rule.

Optionally, the first controller completes, by using the first forwarding device, control on forwarding of data of an AP (for example, the first AP) in the AP cluster controlled by the first controller. Under control of the first controller, the first forwarding device forwards user data of the AP in the AP cluster controlled by the first controller. In addition, the first controller implements management on the AP in the AP cluster controlled by the first controller, including management on a radio resource (for example, a frequency range of a channel of an AP) and radio access.

In this embodiment of the present invention, a first controller manages a first AP, and instructs a first forwarding device to forward user data of the first AP according to a predefined data forwarding rule, which implements control, by the first controller, on forwarding of the user data of the first AP. In addition, the user data is forwarded by the first forwarding device, and a control link between the first controller and the first AP is separated from a data link between the first AP and the first forwarding device, so that control signaling transmitted by using the control link does not affect a data flow transmitted by using the data link, a WLAN data throughput can be improved, and WLAN control reliability is improved.

Figure 6:
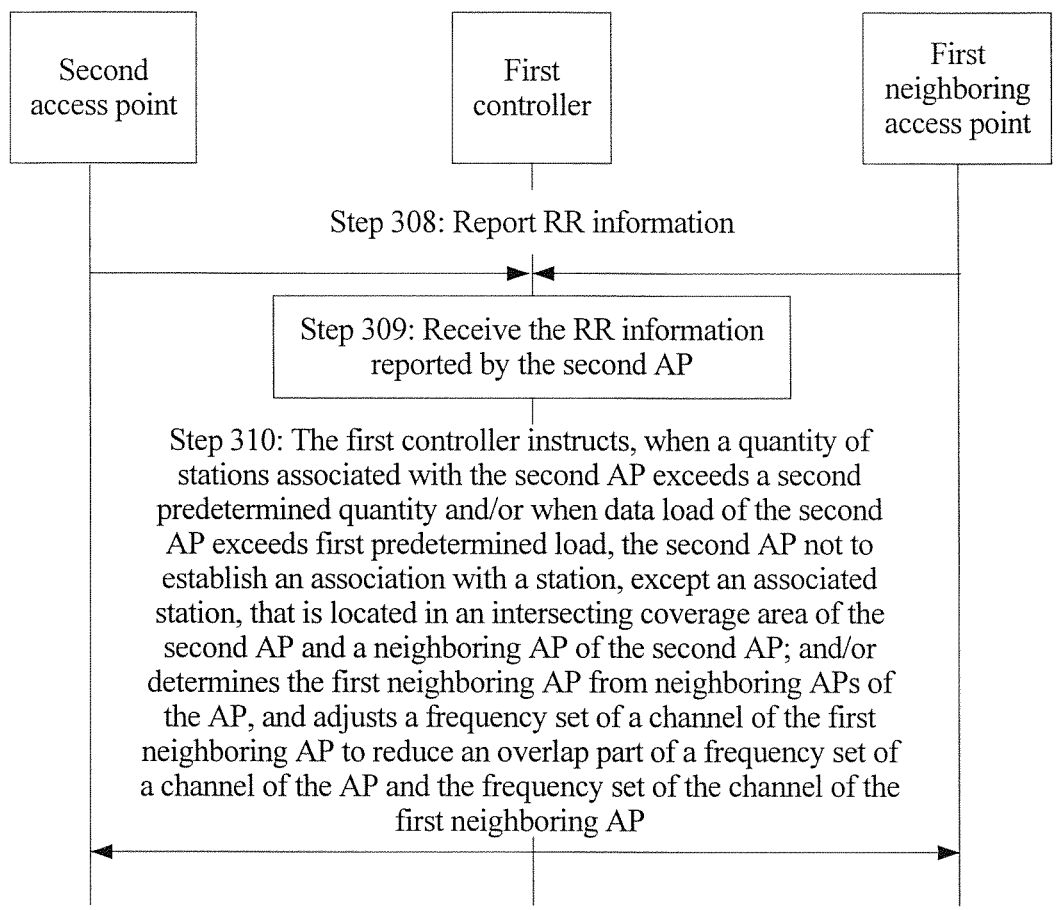

FIG. 6 shows a data forwarding control method according to an embodiment of the present invention, which is applicable to the WLAN network architecture shown in FIG. 3. Referring to FIG. 6, a procedure of the method includes the following steps:

Step 301 to step 307 are the same as step 201 to step 207 shown in FIG. 5, and details are not described herein again.

Step 308: A second AP reports RR information to the first controller, where the second AP belongs to the AP cluster controlled by the first controller.

The RR information includes a quantity of stations associated with the second AP and data load of the second AP.

The RR information further includes an ID of a neighboring AP, in the AP cluster controlled by the first controller, of the second AP, and includes a frequency set of a channel of the second AP. The frequency set of the channel of the second AP at least partially overlaps a frequency set of a channel of a neighboring AP of the second AP. Optionally, the second AP may be the first AP.

Optionally, a station associated with an AP may be a station that establishes a wireless connection to the AP. The AP may monitor, in real time, a quantity of associated stations and an amount of user data of a station that is forwarded by using the AP. In addition, each AP maintains a list of neighboring APs. A list of neighboring APs and a frequency set of a channel of an AP may be set in the AP by network maintenance personnel.

Optionally, an AP may update a list of neighboring APs according to a manner of reporting by a station. The manner of reporting by a station is: when receiving access instructions of at least two APs, a station that is associated with an AP and that is located in an overlapping basic service set (Overlapping Basic Service Set, OBSS for short) area records IDs of the at least two APs, and reports the IDs to the associated AP. The OBSS area may be an overlapping coverage area of the AP and a neighboring AP of the AP.

Optionally, the AP may further record an ID of a station located in the OBSS area. The AP may obtain the ID of the station located in the OBSS area in two manners. In a first manner, the AP may detect, according to strength of a signal sent by the station, whether the station is located in the OBSS area. In a second manner, when the station reports an ID of the neighboring AP of the AP, the AP considers that the station is located in the OBSS area, and may record the ID of the station.

Optionally, each AP in the AP cluster controlled by the first controller may periodically report RR information to the first controller. A change state event request message that is defined in the existing WLAN standard may be extended. For example, a field is added to the change state event request message to carry the RR information.

Step 309: The first controller receives the RR information reported by the second AP.

Optionally, the first controller receives RR information reported by each AP in the AP cluster controlled by the first controller, and stores the RR information.

Step 310: The first controller instructs, when a quantity of stations associated with the second AP exceeds a second predefined quantity and/or when data load of the second AP exceeds first predefined load, the second AP not to establish an association with a station, except an associated station, that is located in an overlapping coverage area of the second AP and a neighboring AP of the second AP; and/or when the quantity of stations associated with the second AP exceeds the second predefined quantity and/or when the data load of the second AP exceeds the first predefined load, the first controller determines a first neighboring AP from neighboring APs of the second AP, and adjusts a frequency set of a channel of the first neighboring AP to reduce an overlap part of a frequency set of a channel of the second AP and the frequency set of the channel of the first neighboring AP.

A quantity of stations associated with the first neighboring AP does not exceed the second predefined quantity and data load of the first neighboring AP does not exceed the first predefined load.

In an embodiment, after detecting that the quantity of stations associated with the second AP exceeds the second predefined quantity and/or that the data load of the second AP exceeds the first predefined load, the second AP sends a radio resource management (Radio Resource Management, RRM for short) request (Request) to the first controller. The RRM request may be in a format of the change state event request message that is defined in the existing WLAN standard. It should be noted that the RRM request may carry the RR information. The first controller receives the RRM request sent by the second AP, and instructs the second AP not to establish an association with the station, except the associated station, that is located in the overlapping coverage area of the second AP and the neighboring AP; and/or determines the first neighboring AP from the neighboring APs of the second AP, and adjusts the frequency set of the channel of the first neighboring AP to reduce the overlap part of the frequency set of the channel of the second AP and the frequency set of the channel of the first neighboring AP.

In another embodiment, the first controller may detect, according to the RR information, whether the quantity of stations associated with the second AP exceeds the second predefined quantity and/or whether the data load of the second AP exceeds the first predefined load. After it is detected that the quantity of stations associated with the second AP exceeds the second predefined quantity and/or that the data load of the second AP exceeds the first predefined load, the first controller instructs a station that is associated with the second AP and that is located in the overlapping coverage area of the second AP and the neighboring AP to establish an association with the neighboring AP; and/or determines the first neighboring AP from the neighboring APs of the second AP, and adjusts the frequency set of the channel of the first neighboring AP to reduce the overlap part of the frequency set of the channel of the second AP and the frequency set of the channel of the first neighboring AP.

Optionally, the first controller delivers control signaling for adjusting a frequency set of a channel and another instruction to an AP. Information that carries the control signaling may be in a format of the change state event request message that is defined in the existing WLAN standard.

In this embodiment of the present invention, a first controller manages a first AP, and instructs a first forwarding device to forward user data of the first AP according to a predefined data forwarding rule, which implements control, by the first controller, on forwarding of the user data of the first AP. In addition, the user data is forwarded by the first forwarding device, and a control link between the first controller and the first AP is separated from a data path between the first AP and the first forwarding device, so that control signaling transmitted by using the control link does not affect a data flow transmitted by using the data link, a WLAN data throughput can be improved, and WLAN control reliability is improved.

Further, a controller receives RR information reported by an AP in an AP cluster of the controller, and instructs, when a quantity of stations associated with the AP exceeds a second predefined quantity and/or when data load of the AP exceeds first predefined load, the AP not to establish an association with a station, except an associated station, that is located in an intersection coverage area of the AP and a neighboring AP of the AP; and/or determines a first neighboring AP from neighboring APs of the AP, and adjusts a frequency set of a channel of the first neighboring AP to reduce an overlap part of a frequency set of a channel of the AP and the frequency set of the channel of the first neighboring AP. The controller can implement control on radio access of the AP, and complete radio resource management on coordination between the AP and a neighboring AP of the AP, so that network traffic of a WLAN is controlled, radio resources of the entire WLAN are optimized, and system performance is improved.

Figure 7:
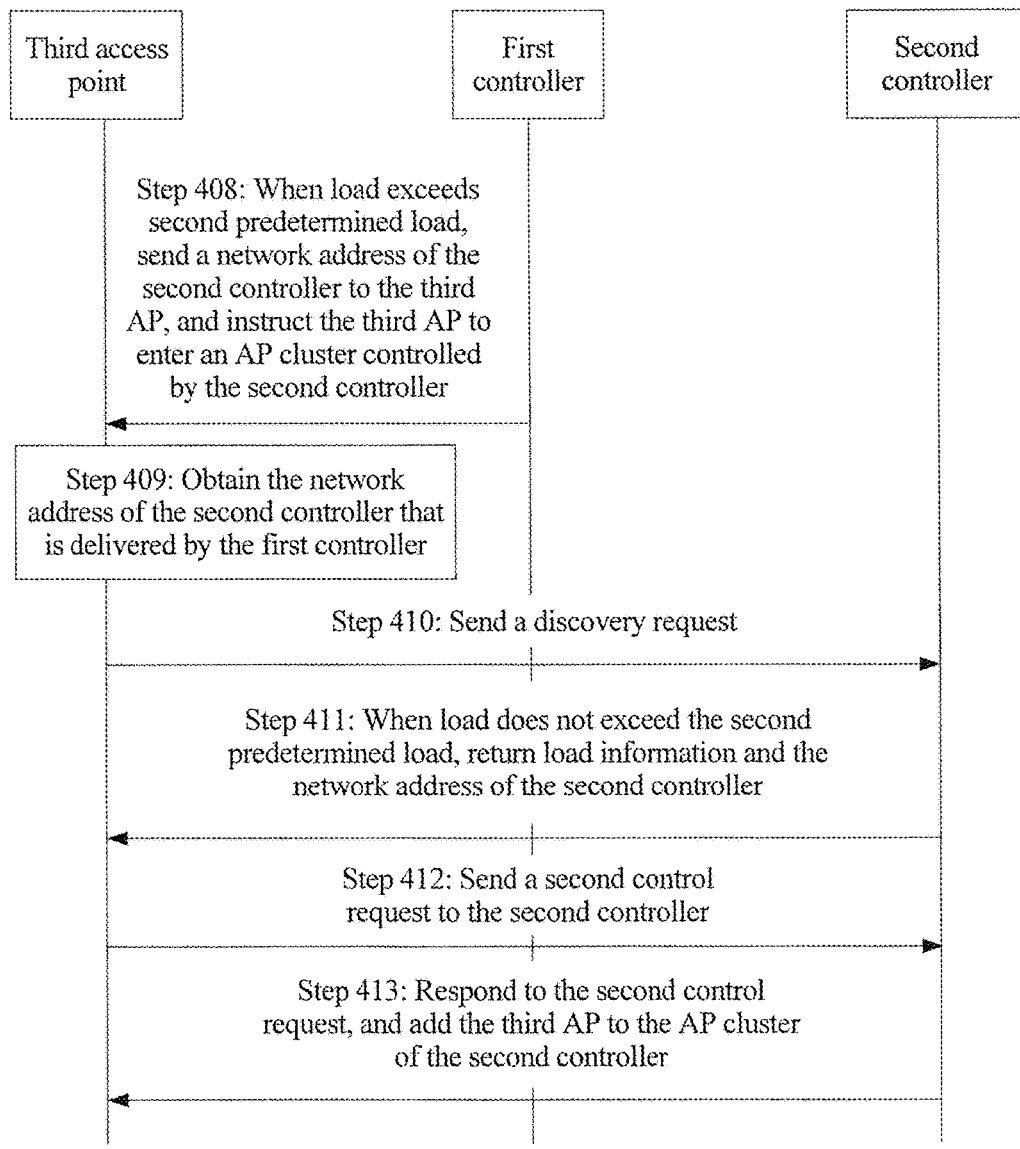

FIG. 7 shows a data forwarding control method according to an embodiment of the present invention, which is applicable to the WLAN network architecture shown in FIG. 3. Referring to FIG. 7, a procedure of the method includes the following steps:

Step 401 to step 407 are the same as step 301 to step 307 shown in FIG. 6, and details are not described herein again.

Step 408: When load on the first controller exceeds second predefined load, the first controller sends a network address of a second controller to at least one third AP in the AP cluster controlled by the first controller, and instructs the third AP to exit from the AP cluster controlled by the first controller and to enter an AP cluster controlled by the second controller.

Load on the second controller does not exceed the second predefined load. Optionally, the third AP may be the second AP. In an implementation manner, the third AP may be an AP, where a quantity of times of coordination between the AP and another AP in the AP cluster controlled by the first controller is less than a predefined quantity of times. The quantity of times of coordination may be a quantity of times of management recorded for each AP by the first controller when radio resource management, such as frequency range allocation, is performed on coordination between APs in the AP cluster in the embodiment shown in FIG. 6. For example, in the embodiment shown in FIG. 6, the first controller (which is assumed to be the CC 241) adjusts a frequency set of a channel of a neighboring AP of the AP 221 when a quantity of stations associated with the AP 221 exceeds the second predefined quantity and/or when data load of the AP 221 exceeds the first predefined load. In this case, the CC 241 may increase a recorded quantity of times of coordination between the AP 221 and the neighboring AP of the AP 221 by one. In another implementation manner, the third AP may be any AP in the AP cluster controlled by the first controller.

Optionally, in the WLAN, the first controller may access another controller by means of addressing and establish a session. By means of the session, the first controller may find the second controller whose load does not exceed the second predefined load. In addition, if the first controller finds at least two second controllers, one second controller may be selected from the at least two second controllers according to a principle of a shortest path, or at least two second controllers may be obtained. It should be noted that the first controller may search for the second controller after the first controller detects that the load exceeds the second predefined load, or before detection by the first controller.

The first controller detects, in real time, whether the load exceeds the second predefined load. When the load on the first controller exceeds the second predefined load, the first controller may instruct the at least one third AP in the AP cluster controlled by the first controller to enter the AP cluster controlled by the second controller.

Optionally, step 408 further includes: when the first controller detects that a quantity of times of coordination between a fourth AP in the AP cluster controlled by the first controller and another AP in the AP cluster is less than the predefined quantity of times, instructing, by the first controller, the fourth AP to exit from the AP cluster controlled by the first controller and to enter an AP cluster controlled by a third controller.

Load on the third controller does not exceed the second predefined load, and the third controller may be the second controller. The first controller detects, in real time, whether a quantity of times of coordination between an AP in the AP cluster and another AP in the AP cluster is less than the predefined quantity of times. When the first controller detects that the quantity of times of coordination between the fourth AP in the AP cluster and the another AP in the AP cluster is less than the predefined quantity of times, the first controller instructs the fourth AP to enter the AP cluster controlled by the third controller.

Optionally, a clear configuration request message that is defined in the existing WLAN standard may be extended. For example, a field is added to deliver control signaling for the first controller to instruct an AP to enter an AP cluster controlled by another controller. In addition, when the control signaling is delivered by using the clear configuration request message, a network address of the another controller may be carried in the message.

Step 409: The third AP obtains the network address of the second controller that is delivered by the first controller, or a fourth AP obtains a network address of a third controller that is delivered by the first controller.

Optionally, the network address of the second controller or the third controller may be sent to an AP by the first controller in advance (before the AP is instructed to enter the AP cluster controlled by the second controller), or may be added to the foregoing clear configuration request message by the first controller.

In addition, there may be at least two second controllers or third controllers.

Step 410: The third AP sends a discovery request to the second controller, or the fourth AP sends a discovery request to the third controller.

Optionally, the discovery request may include a list of neighboring APs of an AP.

Optionally, information that carries the discovery request may be in a format of a discovery request message that is defined in the existing WLAN standard.

Step 411: When load on the second controller does not exceed the second predefined load, the second controller returns load information and the network address of the second controller to the third AP; or when load on the third controller does not exceed the second predefined load, the third controller returns load information and the network address of the third controller to the fourth AP.

Optionally, step 411 further includes: when the load on the second controller does not exceed the second predefined load, and a neighboring AP of the third AP exists in the AP cluster controlled by the second controller, the second controller returns the load information and the network address of the second controller to the third AP, or when the load on the third controller does not exceed the second predefined load, and a neighboring AP of the fourth AP exists in the AP cluster controlled by the third controller, the third controller returns the load information and the network address of the third controller to the fourth AP.

Optionally, a controller may determine, according to load on the controller and/or a list of neighboring APs of an AP, whether to allow the AP to enter. For example, when the load on the second controller does not exceed the second predefined load, the second controller allows the third AP to enter, and returns the load information and the network address of the second controller to the third AP. Further, the second controller may further check whether the neighboring AP of the third AP exists in the AP cluster. If the neighboring AP of the third AP exists, the second controller allows the third AP to enter.

Step 412: The third AP sends a second control request to the second controller, and requests to enter the AP cluster of the second controller; or the fourth AP sends a second control request to the third controller, and requests to enter an AP cluster of the third controller.

Optionally, when at least two controllers allow an AP to enter, the AP may select, according to load information of the controllers, a controller that has smallest load, and send a request for entering to the controller that has the smallest load.

Step 413: The second controller responds to the second control request of the third AP, and adds the third AP to the AP cluster of the second controller; or the third controller responds to the second control request of the fourth AP, and adds the fourth AP to the AP cluster of the third controller.

Optionally, when receiving a response of the second controller to the second control request of the third AP, the third AP may send a request for exiting to the first controller. After receiving the request for exiting, the first controller no longer controls the third AP.

By using step 409 to step 413, it is implemented that, under an instruction of the first controller, the third AP exits from the AP cluster controlled by the first controller and enters the AP cluster controlled by the second controller; or under an instruction of the first controller, the fourth AP exits from the AP cluster controlled by the first controller and enters the AP cluster controlled by the third controller.

In this embodiment of the present invention, a first controller manages a first AP, and instructs a first forwarding device to forward user data of the first AP according to a predefined data forwarding rule, which implements control, by the first controller, on forwarding of the user data of the first AP. In addition, the user data is forwarded by the first forwarding device, and a control link between the first controller and the first AP is separated from a data link between the first AP and the first forwarding device, so that control signaling transmitted by using the control link does not affect a data flow transmitted by using the data path, a WLAN data throughput can be improved, and WLAN control reliability is improved.

Further, when load on a controller exceeds second predefined load, at least one AP in an AP cluster controlled by the controller is instructed to exit from the controlled AP cluster and to enter an AP cluster controlled by another controller; or when detecting that a quantity of times of coordination between an AP in a controlled AP cluster and another AP in the AP cluster is less than a predefined quantity of times, a controller instructs the AP to exit from the controlled AP cluster and to enter an AP cluster controlled by another controller. Therefore, the controller can flexibly manage an AP in the AP cluster, which improves control performance of a system.

Figure 8:
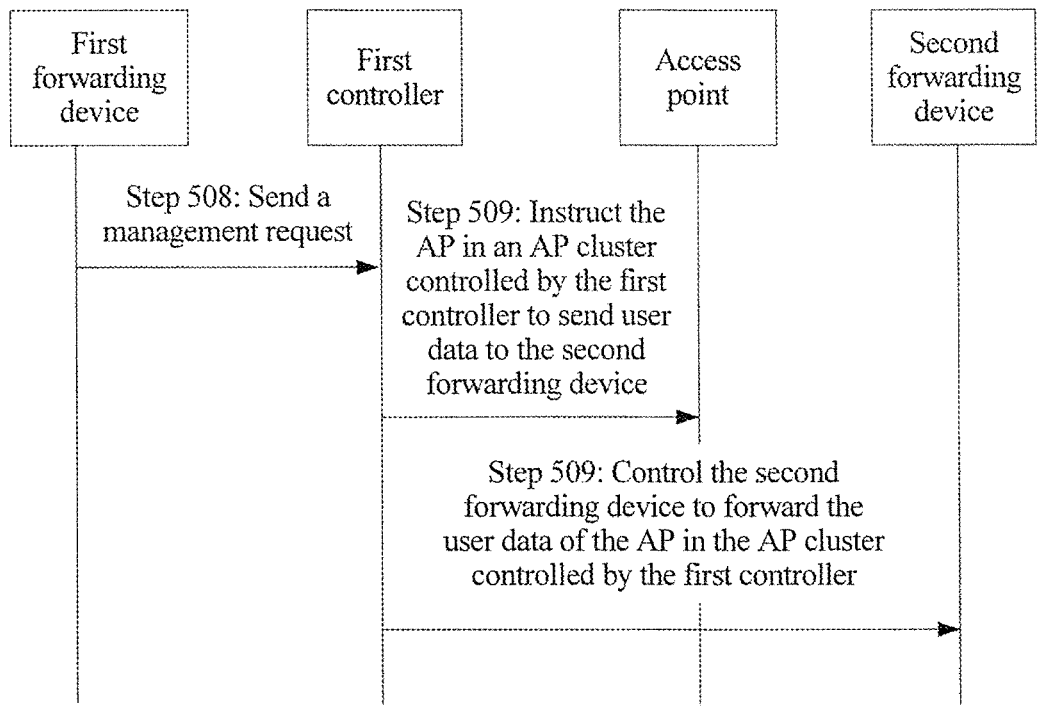

FIG. 8 shows a data forwarding control method according to an embodiment of the present invention, which is applicable to the WLAN network architecture shown in FIG. 3. Referring to FIG. 8, a procedure of the method includes the following steps:

Step 501 to step 507 are the same as step 401 to step 407 shown in FIG. 7, and details are not described herein again.

Step 508: When load on the first forwarding device exceeds third predefined load, the first forwarding device sends a management request to the first controller.

Optionally, when the load on the first forwarding device exceeds the third predefined load, the first forwarding device may extend an echo request message that is defined in the existing WLAN standard, so as to carry the management request.

Step 509: The first controller receives the management request, instructs an AP in the AP cluster controlled by the first controller to send user data to a second forwarding device, and controls the second forwarding device to forward the user data of the AP in the AP cluster controlled by the first controller.

Load on the second forwarding device does not exceed the third predefined load.

Optionally, in the WLAN, the first controller may search for the second forwarding device by means of addressing and establish a session to the second forwarding device. The second forwarding device may determine, according to a load status of the second forwarding device, whether the second forwarding device can forward the user data of the AP in the AP cluster controlled by the first controller. When the second forwarding device can forward the user data of the AP in the AP cluster controlled by the first controller, the first controller broadcasts a network address of the second forwarding device to the AP in the AP cluster controlled by the first controller, and instructs the AP in the AP cluster controlled by the first controller to send the user data to the second forwarding device for forwarding. On an instruction of the first controller, the AP forwards the user data to the second forwarding device.

In this embodiment of the present invention, a first controller manages a first AP, and instructs a first forwarding device to forward user data of the first AP according to a predefined data forwarding rule, which implements control, by the first controller, on forwarding of the user data of the first AP. In addition, the user data is forwarded by the first forwarding device, and a control link between the first controller and the first AP is separated from a data link between the first AP and the first forwarding device, so that control signaling transmitted by using the control link does not affect a data flow transmitted by using the data link, a WLAN data throughput can be improved, and WLAN control reliability is improved.

Further, the first controller receives a management request sent by the first forwarding device when load on the first forwarding device exceeds third predefined load, instructs an AP in an AP cluster controlled by the first controller to send user data to a second forwarding device, and controls the second forwarding device to forward the user data of the AP in the AP cluster controlled by the first controller. Therefore, a controller can flexibly select a forwarding device to forward user data of an AP in an AP cluster, which improves a resource utilization ratio of a system.

Figure 9:
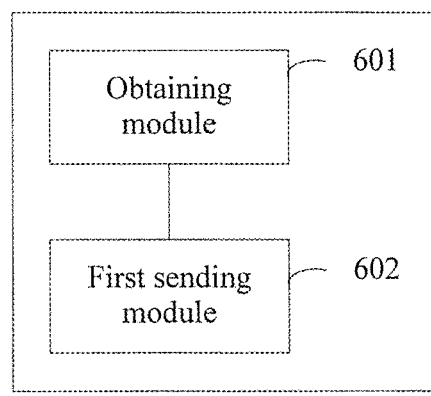
FIG. 9 and FIG. 10 are a schematic structural diagram of a controller according to an embodiment of the present invention.

FIG. 9 shows a controller according to an embodiment of the present invention. The controller may be disposed in a WLAN. For example, the controller may be the CC 241 or the CC 242 shown in FIG. 3. Referring to FIG. 9, the controller includes:

an obtaining module 601, configured to: after receiving a first control request of a first AP, obtain a network address of the first AP, where the first control request is used to request a first controller to manage the first AP; and a first sending module 602, configured to: send a network address of a first forwarding device to the first AP, instruct the first AP to send user data to the first forwarding device, send the network address of the first AP and a predefined data forwarding rule to the first forwarding device, and instruct the first forwarding device to forward the user data of the first AP according to the predefined data forwarding rule.

In this embodiment of the present invention, a first controller manages a first AP, and instructs a first forwarding device to forward user data of the first AP according to a predefined data forwarding rule, which implements control, by the first controller, on forwarding of the user data of the first AP. In addition, the user data is forwarded by the first forwarding device, and a control link between the first controller and the first AP is separated from a data link between the first AP and the first forwarding device, so that control signaling transmitted by using the control link does not affect a data flow transmitted by using the data link, a WLAN data throughput can be improved, and WLAN control reliability is improved.

Figure 10:
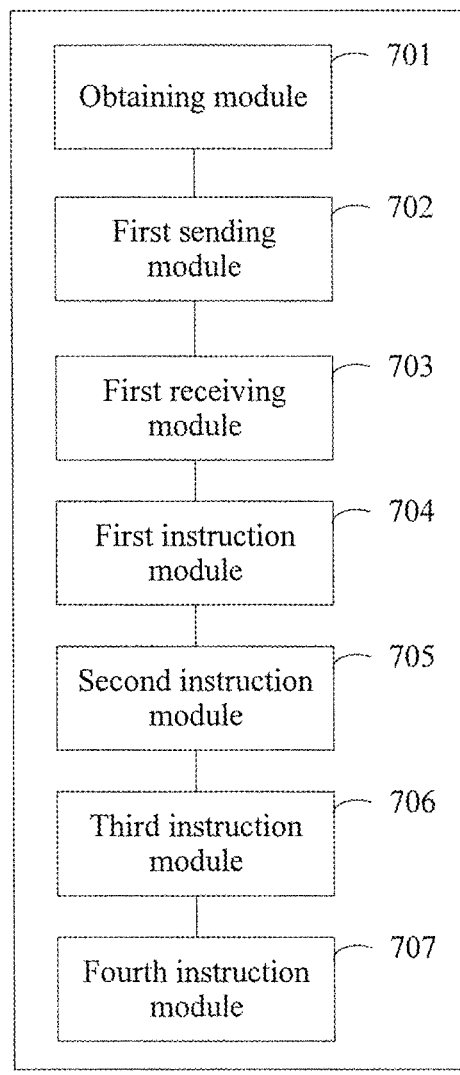

FIG. 10 shows a controller according to an embodiment of the present invention. The controller may be disposed in a WLAN. For example, the controller may be the CC 241 or the CC 242 shown in FIG. 3. Referring to FIG. 10, the controller includes:

an obtaining module 701, configured to: after receiving a first control request of a first AP, obtain a network address of the first AP, where the first control request is used to request a first controller to manage the first AP; where optionally, the obtaining module 701 is configured to: receive a discovery request of the first AP, where the discovery request includes a list of neighboring APs of the first AP, and a frequency set of a channel of the first AP at least partially overlaps a frequency set of a channel of a neighboring AP of the first AP; send load information and a network address of the first controller to the first AP when a quantity of APs in an AP cluster controlled by the first controller does not exceed a first predefined quantity and/or when a neighboring AP of the first AP exists in the AP cluster controlled by the first controller; and receive the first control request, and obtain the network address of the first AP, where the first control request is sent after the first AP receives the load information and the network address of the first controller; and a first sending module 702, configured to: send a network address of a first forwarding device to the first AP, instruct the first AP to send user data to the first forwarding device, send the network address of the first AP and a predefined data forwarding rule to the first forwarding device, and instruct the first forwarding device to forward the user data of the first AP according to the predefined data forwarding rule.

Optionally, the controller further includes:

a first receiving module 703, configured to receive RR information reported by a second AP, where the RR information includes a quantity of stations associated with the second AP and data load of the second AP, and the second AP belongs to the AP cluster controlled by the first controller; and a first instruction module 704, configured to instruct, when the quantity of stations associated with the second AP exceeds a second predefined quantity and/or when the data load of the second AP exceeds first predefined load, the second AP not to establish an association with a station, except an associated station, that is located in an overlapping coverage area of the second AP and a neighboring AP of the second AP.

Optionally, the RR information further includes an ID of a neighboring AP, in the AP cluster controlled by the first controller, of the second AP, and includes a frequency set of a channel of the second AP; and the first instruction module 704 is further configured to:

determine a first neighboring AP from neighboring APs of the second AP when the quantity of stations associated with the second AP exceeds the second predefined quantity and/or when the data load of the second AP exceeds the first predefined load, and adjust a frequency set of a channel of the first neighboring AP to reduce an overlap part of the frequency set of the channel of the second AP and the frequency set of the channel of the first neighboring AP, where a quantity of stations associated with the first neighboring AP does not exceed the second predefined quantity, and data load of the first neighboring AP does not exceed the first predefined load.

Optionally, the first instruction module 704 is configured to: receive an RRM request reported by the second AP, where the RRM request is sent after the second AP detects that the quantity of associated stations exceeds the second predefined quantity and/or that the data load of the second AP exceeds the first predefined load; and instruct the second AP not to establish an association with the station, except the associated station, that is located in the overlapping coverage area of the second AP and the neighboring AP of the second AP.

Optionally, the controller further includes a second instruction module 705, configured to: when load on the first controller exceeds second predefined load, send a network address of a second controller to at least one third AP in the AP cluster controlled by the first controller, and instruct the third AP to exit from the AP cluster controlled by the first controller and to enter an AP cluster controlled by the second controller, where load on the second controller does not exceed the second predefined load.

Optionally, the controller further includes a third instruction module 706, configured to: when the first controller detects that a quantity of times of coordination between a fourth AP in an AP cluster controlled by the first Controller and another AP in the AP cluster is less than a predefined quantity of times, send a network address of a third controller to the fourth AP, and instruct the fourth AP to exit from the AP cluster controlled by the first controller and to enter an AP cluster controlled by the third controller, where load on the third controller does not exceed second predefined load.

Optionally, the controller further includes a fourth instruction module 707, configured to: receive a management request of the first forwarding device, where the management request is sent by the first forwarding device when load on the first forwarding device exceeds third predefined load; and instruct each AP in the AP cluster controlled by the first controller to send user data to a second forwarding device, and control the second forwarding device to forward the user data of each AP in the AP cluster controlled by the first controller, where load on the second forwarding device does not exceed the third predefined load.

In this embodiment of the present invention, a first controller manages a first AP, and instructs a first forwarding device to forward user data of the first AP according to a predefined data forwarding rule, which implements control, by the first controller, on forwarding of the user data of the first AP. In addition, the user data is forwarded by the first forwarding device, and a control link between the first controller and the first AP is separated from a data link between the first AP and the first forwarding device, so that control signaling transmitted by using the control link does not affect a data flow transmitted by using the data link, a WLAN data throughput can be improved, and WLAN control reliability is improved.

Figure 11:
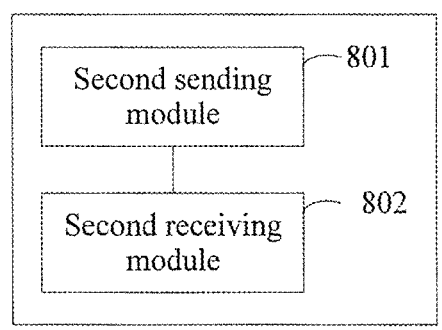
FIG. 11 and FIG. 12 are a schematic structural diagram of an access device according to an embodiment of the present invention.

FIG. 11 shows an access device according to an embodiment of the present invention. The access device may be disposed in a WLAN. For example, the access device may be any AP shown in FIG. 3. Referring to FIG. 11, the access device includes:

a second sending module 801, configured to send a first control request to a first controller, where the first control request is used to request the first controller to manage an AP; and a second receiving module 802, configured to: receive a network address of a first forwarding device that is sent by the first controller, and send user data to the first forwarding device according to an instruction of the first controller.

In this embodiment of the present invention, a first controller manages a first AP, and instructs a first forwarding device to forward user data of the first AP according to a predefined data forwarding rule, which implements control, by the first controller, on forwarding of the user data of the first AP. In addition, the user data is forwarded by the first forwarding device, and a control link between the first controller and the first AP is separated from a data link between the first AP and the first forwarding device, so that control signaling transmitted by using the control link does not affect a data flow transmitted by using the data link, a WLAN data throughput can be improved, and WLAN control reliability is improved.

Figure 12:
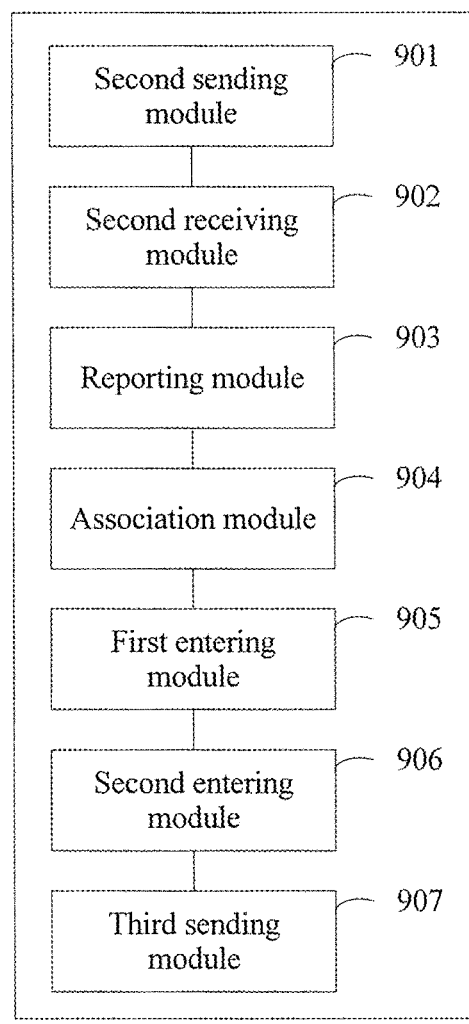

FIG. 12 shows an access device according to an embodiment of the present invention. The access device may be disposed in a WLAN. For example, the access device may be any AP shown in FIG. 3. Referring to FIG. 12, the access device includes:

a second sending module 901, configured to send a first control request to a first controller, where the first control request is used to request the first controller to manage an AP; where optionally, the second sending module 901 is configured to: send a discovery request to the first controller, where the discovery request includes a list of neighboring APs of the AP, and a frequency set of a channel of the AP at least partially overlaps a frequency set of a channel of a neighboring AP of the AP; and receive load information and a network address of the first controller that are sent by the first controller, and send the first control request to the first controller, where the load information and the network address of the first controller are sent to the AP after the first controller receives the discovery request and when a quantity of APs in an AP cluster controlled by the first controller does not exceed a first predefined quantity and/or when a neighboring AP of the AP exists in the AP cluster controlled by the first controller; and a second receiving module 902, configured to: receive a network address of a first forwarding device that is sent by the first controller, and send user data to the first forwarding device according to an instruction of the first controller.

Optionally, the access device further includes:

a reporting module 903, configured to report RR information to the first controller, where the RR information includes a quantity of stations associated with the AP and data load of the AP; and an association module 904, configured to skip, under an instruction of the first controller, establishing an association with a station, except an associated station, that is located in an overlapping coverage area of the AP and a neighboring AP of the AP, where the instruction of the first controller is delivered to the AP when the quantity of stations associated with the AP exceeds a second predefined quantity and/or the data load of the AP exceeds first predefined load.

Optionally, the RR information further includes an ID of a neighboring AP, in the AP cluster controlled by the first controller, of the AP, and a frequency set of a channel of the AP. After the first controller adjusts a frequency set of a channel of a first neighboring AP of the AP, an overlap part of the frequency set of the channel of the AP and the frequency set of the channel of the first neighboring AP is reduced, where the first controller adjusts the frequency set of the channel of the first neighboring AP when the quantity of stations associated with the AP exceeds the second predefined quantity and/or when the data load of the AP exceeds the first predefined load, the first neighboring AP is determined from neighboring APs of the AP by the first controller, a quantity of stations associated with the first neighboring AP does not exceed the second predefined quantity, and data load of the first neighboring AP does not exceed the first predefined load.

Optionally, the association module 904 is configured to: send an RRM request to the first controller after it is detected that the quantity of stations associated with the AP exceeds the second predefined quantity and/or that the data load of the AP exceeds the first predefined load, so that after receiving the RRM request, the first controller instructs the AP not to establish an association with the station, except the associated station, that is located in the overlapping coverage area of the AP and the neighboring AP of the AP; and skip, under the instruction of the first controller, establishing an association with the station, except the associated station, that is located in the overlapping coverage area of the AP and the neighboring AP of the AP.

Optionally, the access device further includes a first entering module 905, configured to: according to an instruction delivered by the first controller when load on the first controller exceeds second predefined load, exit from the AP cluster controlled by the first controller and enter an AP cluster controlled by a second controller, where load on the second controller does not exceed the second predefined load.

Optionally, the access device further includes a second entering module 906, configured to: according to an instruction delivered by the first controller when the first controller detects that a quantity of times of coordination between the AP and another AP in the AP cluster is less than a predefined quantity of times, exit from the AP cluster controlled by the first controller and enter an AP cluster controlled by a third controller.

Optionally, the access device further includes a third sending module 907, configured to: under an instruction of the first controller, send the user data to a second forwarding device, where load on the first forwarding device exceeds third predefined load, and load on the second forwarding device does not exceed the third predefined load.

In this embodiment of the present invention, a first controller manages a first AP, and instructs a first forwarding device to forward user data of the first AP according to a predefined data forwarding rule, which implements control, by the first controller, on forwarding of the user data of the first AP. In addition, the user data is forwarded by the first forwarding device, and a control link between the first controller and the first AP is separated from a data link between the first AP and the first forwarding device, so that control signaling transmitted by using the control link does not affect a data flow transmitted by using the data link, a WLAN data throughput can be improved, and WLAN control reliability is improved.

Figure 13:
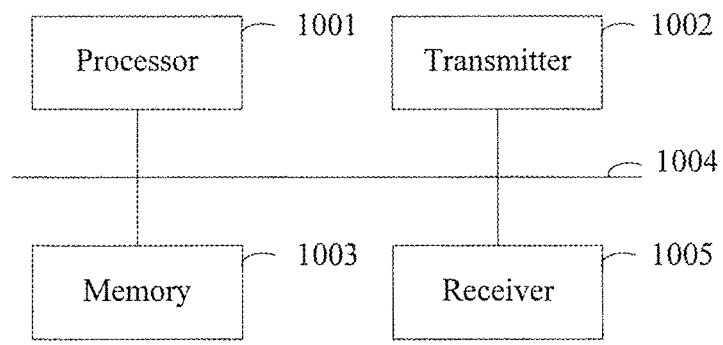
FIG. 13 is a schematic structural diagram of hardware of a controller according to an embodiment of the present invention.

In a specific implementation manner, the controller shown in FIG. 9 or FIG. 10 may be a server, where the server is applicable to the management method shown in FIG. 4 to FIG. 8. Referring to FIG. 13, the server generally includes at least one processor 1001 (for example, a CPU), a transmitter 1002, a memory 1003, at least one communications bus 1004, and a receiver 1005. Persons skilled in the art may understand that a structure of the server shown in FIG. 13 does not constitute any limitation on the controller, where the controller may include more or fewer parts than those shown in the figure, or a combination of some parts, or have different part arrangements.

The following describes the constituent parts of the controller in detail with reference to FIG. 13.

The communications bus 1004 is configured to implement connection and communication between the processor 1001, the memory 1003, the transmitter 1002, and the receiver 1005.

The transmitter 1002 and the receiver 1005 may implement connection and communication between the controller and at least one server (for example, a forwarding device and an access device) by using the Internet, a wide area network, a local area network, a metropolitan area network, and the like.

The memory 1003 may be configured to store a software program and an application module. By running the software program and the application module that are stored in the memory 1003, the processor 1001 executes various functional applications of the controller and performs data processing. The memory 1003 may mainly include a program storage area and a data storage area, where the program storage area may store an operating system, an application program required by at least one function (for example, delivery of control signaling), and the like, and the data storage area may store data (for example, RR information is stored) created according to use of the controller, and the like. In addition, the memory 1003 may include a high-speed RAM (Random Access Memory, random access memory), and may further include a non-volatile memory (non-volatile memory), for example, at least one disk storage component, a flash memory component, or another volatile solid state storage component.

The processor 1001 is a control center of the controller, uses various interfaces and lines to connect to various parts of the entire controller, and executes various functions of the controller and processes data by running or executing the software program and/or the application module stored in the memory 1003 and by invoking data stored in the memory 1003, so as to perform overall monitoring on the controller.

Specifically, by running or executing the software program and/or the application module stored in the memory 1003 and by invoking the data stored in the memory 1003, the processor 1001 may implement: after the receiver 1005 receives a first control request of a first AP, obtaining a network address of the first AP, where the first control request is used to request a first controller to manage the first AP; sending a network address of a first forwarding device to the first AP by using the transmitter 1002, and instructing the first AP to send user data to the first forwarding device; sending the network address of the first AP and a predefined data forwarding rule to the first forwarding device by using the transmitter 1002, and instructing the first forwarding device to forward the user data of the first AP according to the predefined data forwarding rule.

Optionally, the receiver 1005 may implement receiving a discovery request of the first AP, where the discovery request includes a list of neighboring APs of the first AP, and a frequency set of a channel of the first AP at least partially overlaps a frequency set of a channel of a neighboring AP of the first AP. The processor 1001 may implement: sending, by using the transmitter 1002, load information and a network address of the first controller to the first AP when a quantity of APs in an AP cluster controlled by the first controller does not exceed a first predefined quantity and/or when a neighboring AP of the first AP exists in the AP cluster controlled by the first controller; and receiving the first control request by using the receiver 1005, and obtaining the network address of the first AP, where the first control request is sent after the first AP receives the load information and the network address of the first controller.

Optionally, the receiver 1005 may implement receiving RR information reported by a second AP, where the RR information includes a quantity of stations associated with the second AP and data load of the second AP, and the second AP belongs to the AP cluster controlled by the first controller. The processor 1001 may implement: when the quantity of stations associated with the second AP exceeds a second predefined quantity and/or when the data load of the second AP exceeds first predefined load, instructing the second AP not to establish an association with a station, except an associated station, that is located in an overlapping coverage area of the second AP and a neighboring AP of the second AP.

Optionally, the RR information further includes an ID of a neighboring AP, in the AP cluster controlled by the first controller, of the second AP, and includes a frequency set of a channel of the second AP. The processor 1001 may implement: determining a first neighboring AP from neighboring APs of the second AP when the quantity of stations associated with the second AP exceeds the second predefined quantity and/or when the data load of the second AP exceeds the first predefined load, and adjusting a frequency set of a channel of the first neighboring AP to reduce an overlap part of the frequency set of the channel of the second AP and the frequency set of the channel of the first neighboring AP, where a quantity of stations associated with the first neighboring AP does not exceed the second predefined quantity, and data load of the first neighboring AP does not exceed the first predefined load.

Optionally, the receiver 1005 may implement receiving an RRM request reported by the second AP, where the RRM request is sent after the second AP detects that the quantity of associated stations exceeds the second predefined quantity and/or that the data load of the second AP exceeds the first predefined load. The processor 1001 may implement instructing the second AP not to establish an association with the station, except the associated station, that is located in the overlapping coverage area of the second AP and the neighboring AP of the second AP.

Optionally, the processor 1001 may implement: when load on the first controller exceeds second predefined load, sending, by using the transmitter 1002, a network address of a second controller to at least one third AP in the AP cluster controlled by the first controller, and instructing the third AP to exit from the AP cluster controlled by the first controller and to enter an AP cluster controlled by the second controller, where load on the second controller does not exceed the second predefined load.

Optionally, the processor 1001 may implement: when the first controller detects that a quantity of times of coordination between a fourth AP in an AP cluster controlled by the first Controller and another AP in the AP cluster is less than a predefined quantity of times, sending a network address of a third controller to the fourth AP by using the transmitter 1002, and instructing the fourth AP to exit from the AP cluster controlled by the first controller and to enter an AP cluster controlled by the third controller, where load on the third controller does not exceed second predefined load.

Optionally, the receiver 1005 may implement receiving a management request of the first forwarding device, where the management request is sent by the first forwarding device when load on the first forwarding device exceeds third predefined load. The processor 1001 may implement: instructing each AP in the AP cluster controlled by the first controller to send user data to a second forwarding device, and controlling the second forwarding device to forward the user data of each AP in the AP cluster controlled by the first controller, where load on the second forwarding device does not exceed the third predefined load.

In this embodiment of the present invention, a first controller manages a first AP, and instructs a first forwarding device to forward user data of the first AP according to a predefined data forwarding rule, which implements control, by the first controller, on forwarding of the user data of the first AP. In addition, the user data is forwarded by the first forwarding device, and a control link between the first controller and the first AP is separated from a data link between the first AP and the first forwarding device, so that control signaling transmitted by using the control link does not affect a data flow transmitted by using the data link, a WLAN data throughput can be improved, and WLAN control reliability is improved.

Figure 14:
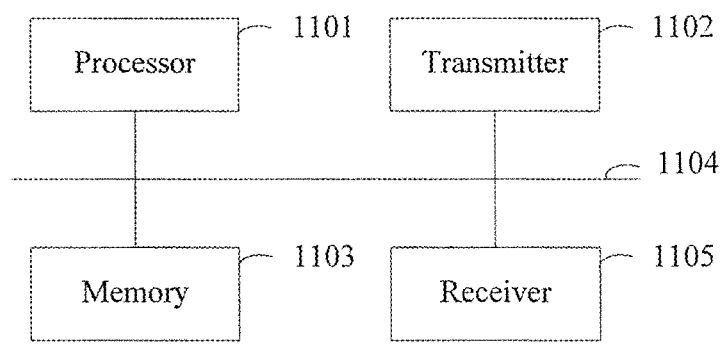
FIG. 14 is a schematic structural diagram of hardware of an access device according to an embodiment of the present invention.

In a specific implementation manner, the access device shown in FIG. 11 or FIG. 12 may be a server, where the server is applicable to the management method shown in FIG. 4 to FIG. 8. Referring to FIG. 14, the server generally includes at least one processor 1101 (for example, a CPU), a transmitter 1102, a memory 1103, at least one communications bus 1104, and a receiver 1105. Persons skilled in the art may understand that a structure of the server shown in FIG. 14 does not constitute any limitation on the access device, where the server may include more or fewer parts than those shown in the figure, or a combination of some parts, or have different part arrangements.

The following describes the constituent parts of the access device in detail with reference to FIG. 14.

The communications bus 1104 is configured to implement connection and communication between the processor 1101, the memory 1103, the transmitter 1102, and the receiver 1105.

The transmitter 1102 and the receiver 1105 may implement connection and communication between the access device and at least one server (for example, a controller) by using the Internet, a wide area network, a local area network, a metropolitan area network, and the like.

The memory 1103 may be configured to store a software program and an application module. By running the software program and the application module that are stored in the memory 1103, the processor 1101 executes various functional applications of the controller and performs data processing. The memory 1103 may mainly include a program storage area and a data storage area, where the program storage area may store an operating system, an application program required by at least one function (for example, reporting RR information), and the like, and the data storage area may store data (for example, a network address of a second controller is stored) created according to use of the controller, and the like. In addition, the memory 1103 may include a high-speed RAM (Random Access Memory, random access memory), and may further include a non-volatile memory (non-volatile memory), for example, at least one disk storage component, a flash memory component, or another volatile solid state storage component.

The processor 1101 is a control center of the controller, uses various interfaces and lines to connect to various parts of the entire controller, and executes various functions of the controller and processes data by running or executing the software program and/or the application module stored in the memory 1103 and by invoking data stored in the memory 1103, so as to perform overall monitoring on the controller.

Specifically, by running or executing the software program and/or the application module stored in the memory 1103 and by invoking the data stored in the memory 1103, the transmitter 1102 may implement: sending a first control request to a first controller, where the first control request is used to request the first controller to manage an AP; receiving, by using the receiver 1105, a network address of a first forwarding device that is sent by the first controller, and sending user data to the first forwarding device according to an instruction of the first controller.

Optionally, the transmitter 1102 may implement: sending a discovery request to the first controller, where the discovery request includes a list of neighboring APs of the AP, and a frequency set of a channel of the AP at least partially overlaps a frequency set of a channel of a neighboring AP of the AP; and receiving, by using the receiver 1105, load information and a network address of the first controller that are sent by the first controller, and sending the first control request to the first controller, where the load information and the network address of the first controller are sent to the AP after the first controller receives the discovery request and when a quantity of APs in an AP cluster controlled by the first controller does not exceed a first predefined quantity and/or when a neighboring AP of the AP exists in the AP cluster controlled by the first controller.

Optionally, the transmitter 1102 may implement reporting RR information to the first controller, where the RR information includes a quantity of stations associated with the AP and data load of the AP. The processor 1101 may implement skipping, under an instruction of the first controller, establishing an association with a station, except an associated station, that is located in an overlapping coverage area of the AP and a neighboring AP of the AP, where the instruction of the first controller is delivered to the AP when the quantity of stations associated with the AP exceeds a second predefined quantity and/or the data load of the AP exceeds first predefined load.

Optionally, the RR information further includes an ID of a neighboring AP, in the AP cluster controlled by the first controller, of the AP, and a frequency set of a channel of the AP, and the processor 1101 may implement: after the first controller adjusts a frequency set of a channel of a first neighboring AP of the AP, an overlap part of the frequency set of the channel of the AP and the frequency set of the channel of the first neighboring AP is reduced, where the first controller adjusts the frequency set of the channel of the first neighboring AP when the quantity of stations associated with the AP exceeds the second predefined quantity and/or when the data load of the AP exceeds the first predefined load, the first neighboring AP is determined from neighboring APs of the AP by the first controller, a quantity of stations associated with the first neighboring AP does not exceed the second predefined quantity, and data load of the first neighboring AP does not exceed the first predefined load.

Optionally, the processor 1101 may implement: sending, by using the transmitter 1102, an RRM request to the first controller after it is detected that the quantity of stations associated with the AP exceeds the second predefined quantity and/or that the data load of the AP exceeds the first predefined load, so that after receiving the RRM request, the first controller instructs the AP not to establish an association with the station, except the associated station, that is located in the overlapping coverage area of the AP and the neighboring AP of the AP; and skipping, under the instruction of the first controller, establishing an association with the station, except the associated station, that is located in the overlapping coverage area of the AP and the neighboring AP of the AP.

Optionally, the processor 1101 may implement: according to an instruction delivered by the first controller when load on the first controller exceeds second predefined load, exiting from the AP cluster controlled by the first controller and entering an AP cluster controlled by a second controller, where load on the second controller does not exceed the second predefined load.

Optionally, the processor 1101 may implement: according to an instruction delivered by the first controller when the first controller detects that a quantity of times of coordination between the AP and another AP in the AP cluster is less than a predefined quantity of times, exiting from the AP cluster controlled by the first controller and entering an AP cluster controlled by a third controller.

Optionally, the processor 1101 may implement: under an instruction of the first controller, sending the user data to a second forwarding device by using the transmitter 1102, where load on the first forwarding device exceeds third predefined load, and load on the second forwarding device does not exceed the third predefined load.

In this embodiment of the present invention, a first controller manages a first AP, and instructs a first forwarding device to forward user data of the first AP according to a predefined data forwarding rule, which implements control, by the first controller, on forwarding of the user data of the first AP. In addition, the user data is forwarded by the first forwarding device, and a control link between the first controller and the first AP is separated from a data link between the first AP and the first forwarding device, so that control signaling transmitted by using the control link does not affect a data flow transmitted by using the data link, a WLAN data throughput can be improved, and WLAN control reliability is improved.

Figure 15:
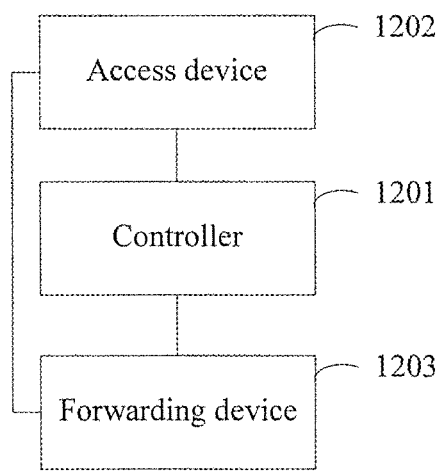
FIG. 15 is a schematic structural diagram of a data forwarding control system according to an embodiment of the present invention.

FIG. 15 shows a data forwarding control system according to an embodiment of the present invention, where the system is applicable to the WLAN network architecture shown in FIG. 3. Referring to FIG. 15, the system includes a controller 1201, an access device 1202, and a forwarding device 1203.

The controller 1201 may be the controller shown in FIG. 9, FIG. 10, or FIG. 13, and details are not described herein again.

The access device 1202 may be the access device shown in FIG. 11, FIG. 12, or FIG. 14, and details are not described herein again.

The forwarding device 1203 is configured to: under control of the controller 1201, receive user data that is sent by the access device 1202 controlled by the controller 1201, and forward the received user data according to a predefined data forwarding rule.

In this embodiment of the present invention, a first controller manages a first AP, and instructs a first forwarding device to forward user data of the first AP according to a predefined data forwarding rule, which implements control, by the first controller, on forwarding of the user data of the first AP. In addition, the user data is forwarded by the first forwarding device, and a control link between the first controller and the first AP is separated from a data link between the first AP and the first forwarding device, so that control signaling transmitted by using the control link does not affect a data flow transmitted by using the data link, a WLAN data throughput can be improved, and WLAN control reliability is improved.

It should be noted that: when the controller provided in the foregoing embodiment controls data forwarding or the access device sends data, division of the foregoing function modules is used only as an example for description. In practical application, the foregoing functions may be allocated to different function modules for implementation according to a requirement, that is, an internal structure of the device is divided into different function modules to implement all or a part of the functions described above. In addition, the controller or the access device provided in the foregoing embodiment is based on the same conception as the embodiments illustrating the data forwarding control method. For a specific implementation process, refer to the method embodiments, and details are not described herein again.

The sequence numbers of the foregoing embodiments of the present invention are merely for illustrative purposes, and are not intended to indicate priorities of the embodiments.

Persons of ordinary skill in the art may understand that all or some of the steps of the embodiments may be implemented by hardware or a program instructing related hardware. The program may be stored in a computer-readable storage medium. The storage medium may include: a read-only memory, a magnetic disk, an optical disc, or the like.

The foregoing descriptions are merely embodiments of the present invention, but are not intended to limit the present invention. Any modification, equivalent replacement, and improvement made without departing from the principle of the present invention shall fall within the protection scope of the present invention.

What is claimed is:

1. A data forwarding control method, comprising:
receiving, by a first controller, a discovery request of a first access point (AP), wherein the discovery request comprises a list of neighboring APs of the first AP, and wherein a frequency set of a channel of the first AP at least partially overlaps a frequency set of a channel of a neighboring AP of the first AP;
sending load information and a network address of the first controller to the first AP when a quantity of APs in an AP cluster controlled by the first controller does not exceed a first predefined quantity and/or when a neighboring AP of the first AP exists in the AP cluster controlled by the first controller;
receiving, by the first controller, a first control request of the first AP for requesting the first controller to manage the first AP wherein the first control request is received after the first controller sends the load information and the network address of the first controller to the first AP;
obtaining, by the first controller, a network address of the first AP; and
sending a network address of a first forwarding device to the first AP for instructing the first AP to send user data to the first forwarding device, sending the network address of the first AP and a predefined data forwarding rule to the first forwarding device for instructing the first forwarding device to forward the user data of the first AP according to the predefined data forwarding rule.

2. A data forwarding control method, comprising:
receiving, by a first controller, a first control request of a first access point (AP) for requesting the first controller to manage the first AP;
obtaining, by the first controller, a network address of the first AP;
sending a network address of a first forwarding device to the first AP, instructing the first AP to send user data to the first forwarding device, sending the network address of the first AP and a predefined data forwarding rule to the first forwarding device, and instructing the first forwarding device to forward the user data of the first AP according to the predefined data forwarding rule;
receiving, by the first controller, radio resource (RR) information reported by a second AP, wherein the RR information comprises a quantity of stations associated with the second AP and a data load of the second AP, and the second AP belongs to an AP cluster controlled by the first controller; and
instructing, when the quantity of stations associated with the second AP exceeds a second predefined quantity and/or when the data load of the second AP exceeds a first predefined load, the second AP not to establish an association with a station, except an associated station, that is located in an overlapping coverage area of the second AP and a neighboring AP of the second AP.

3. The method according to claim 2, wherein the RR information further comprises an identifier (ID) of a neighboring AP, in the AP cluster controlled by the first controller, of the second AP, and comprises a frequency set of a channel of the second AP; and
the method further comprises:
determining a first neighboring AP from neighboring APs of the second AP when the quantity of stations associated with the second AP exceeds the second predefined quantity and/or when the data load of the second AP exceeds the first predefined load, and adjusting a frequency set of a channel of the first neighboring AP to reduce an overlap part of the frequency set of the channel of the second AP and the frequency set of the channel of the first neighboring AP, wherein a quantity of stations associated with the first neighboring AP does not exceed the second predefined quantity, and a data load of the first neighboring AP does not exceed the first predefined load.

4. The method according to claim 2, wherein the method further comprises:
when load on the first controller exceeds a second predefined load, sending a network address of a second controller to at least one third AP in an AP cluster controlled by the first controller, and instructing the third AP to exit from the AP cluster controlled by the first controller and to enter an AP cluster controlled by the second controller, wherein a load on the second controller does not exceed the second predefined load.

5. The method according to claim 2, wherein the method further comprises:
when the first controller detects that a quantity of times of coordination between a fourth AP in an AP cluster controlled by the first controller and another AP in the AP cluster is less than a predefined quantity of times, sending a network address of a third controller to the fourth AP, and instructing the fourth AP to exit from the AP cluster controlled by the first controller and to enter an AP cluster controlled by the third controller, wherein a load on the third controller does not exceed the second predefined load.

6. A data forwarding control method, comprising:
sending, by an access point (AP), a discovery request to a first controller, wherein the discovery request comprises a list of neighboring APs of the AP, and wherein a frequency set of a channel of the AP at least partially overlaps a frequency set of a channel of a neighboring AP of the AP;
receiving load information and a network address of the first controller that are sent by the first controller, and
sending a first control request to the first controller for requesting the first controller to manage the first AP, wherein the load information and the network address of the first controller are sent to the AP after the first controller receives the discovery request and when a quantity of APs in an AP cluster controlled by the first controller does not exceed a first predefined quantity and/or when a neighboring AP of the AP exists in the AP cluster controlled by the first controller;
receiving a network address of a first forwarding device that is sent by the first controller, and
sending user data to the first forwarding device according to an instruction of the first controller.

7. A data forwarding control method, comprising:
sending, by an access point (AP), a first control request to a first controller for requesting the first controller to manage the AP;
receiving a network address of a first forwarding device that is sent by the first controller, and sending user data to the first forwarding device according to an instruction of the first controller; and
reporting radio resource (RR) information to the first controller, wherein the RR information comprises a quantity of stations associated with the AP and a data load of the AP; and
skipping, under an instruction of the first controller, establishing an association with a station, except an associated station, that is located in an overlapping coverage area of the AP and a neighboring AP of the AP, wherein the instruction of the first controller is delivered to the AP when the quantity of stations associated with the AP exceeds a second predefined quantity and/or when the data load of the AP exceeds a first predefined load.

8. The method according to claim 7, wherein the method further comprises:
according to an instruction delivered by the first controller when a load on the first controller exceeds a second predefined load, exiting from an AP cluster controlled by the first controller and entering an AP cluster controlled by a second controller, wherein a load on the second controller does not exceed the second predefined load.

9. A controller, wherein the controller is a first controller, which comprises:
a receiver, configured to receive a discovery request of a first access point (AP), wherein the discovery request comprises a list of neighboring APs of the first AP, and wherein a frequency set of a channel of the first AP at least partially overlaps a frequency set of a channel of a neighboring AP of the first AP;
a transmitter configured to send load information and a network address of the first controller to the first AP when a quantity of APs in an AP cluster controlled by the first controller does not exceed a first predefined quantity and/or when a neighboring AP of the first AP exists in the AP cluster controlled by the first controller;
wherein the receiver is further configured to:
receive a first control request of the first AP for requesting the first controller to manage the first AP; and
obtain the network address of the first AP, wherein the first control request is sent after the first AP receives the load information and the network address of the first controller; and
wherein the transmitter is further configured to send a network address of a first forwarding device to the first AP, instruct the first AP to send user data to the first forwarding device, send the network address of the first AP and a predefined data forwarding rule to the first forwarding device, and instruct the first forwarding device to forward the user data of the first AP according to the predefined data forwarding rule.

10. A controller, wherein the controller is a first controller, which comprises:
a receiver, configured to:
receive a first control request of a first access point (AP) for requesting the first controller to manage the first AP; and
obtain a network address of the first AP;
a transmitter, configured to send a network address of a first forwarding device to the first AP, instruct the first AP to send user data to the first forwarding device, send the network address of the first AP and a predefined data forwarding rule to the first forwarding device, and instruct the first forwarding device to forward the user data of the first AP according to the predefined data forwarding rule; and wherein the receiver is further configured to receive radio resource (RR) information reported by a second AP, wherein the RR information comprises a quantity of stations associated with the second AP and a data load of the second AP, and the second AP belongs to an AP cluster controlled by the first controller; and the controller further comprises:
a processor, configured to instruct, when the quantity of stations associated with the second AP exceeds a second predefined quantity and/or when the data load of the second AP exceeds first predefined load, the second AP not to establish an association with a station, except an associated station, that is located in an overlapping coverage area of the second AP and a neighboring AP of the second AP.

11. The controller according to claim 10, wherein the RR information further comprises an identifier (ID) of a neighboring AP, in the AP cluster controlled by the first controller, of the second AP, and comprises a frequency set of a channel of the second AP; and the processor is further configured to:
determine a first neighboring AP from neighboring APs of the second AP when the quantity of stations associated with the second AP exceeds the second predefined quantity and/or when the data load of the second AP exceeds the first predefined load, and adjust a frequency set of a channel of the first neighboring AP to reduce an overlap part of the frequency set of the channel of the second AP and the frequency set of the channel of the first neighboring AP, wherein a quantity of stations associated with the first neighboring AP does not exceed the second predefined quantity, and a data load of the first neighboring AP does not exceed the first predefined load.

12. The controller according to claim 10, wherein:
the transmitter is further configured to:
when a load on the first controller exceeds a second predefined load, send a network address of a second controller to at least one third AP in an AP cluster controlled by the first controller, and instruct the third AP to exit from the AP cluster controlled by the first controller and to enter an AP cluster controlled by the second controller, wherein a load on the second controller does not exceed the second predefined load.

13. The controller according to claim 10, wherein:
the transmitter is further configured to:
when the first controller detects that a quantity of times of coordination between a fourth AP in an AP cluster controlled by the first controller and another AP in the AP cluster is less than a predefined quantity of times, send a network address of a third controller to the fourth AP, and instruct the fourth AP to exit from the AP cluster controlled by the first controller and to enter an AP cluster controlled by the third controller, wherein a load on the third controller does not exceed a second predefined load.

14. An access point (AP), comprising:
a transmitter configured to send a discovery request to a first controller, wherein the discovery request comprises a list of neighboring APs of the AP, and a frequency set of a channel of the AP at least partially overlaps a frequency set of a channel of a neighboring AP of the AP; and
a receiver configured to receive load information and a network address of the first controller that are sent by the first controller, wherein the load information and the network address of the first controller are sent to the AP after the first controller receives the discovery request and when a quantity of APs in an AP cluster controlled by the first controller does not exceed a first predefined quantity and/or when a neighboring AP of the AP exists in the AP cluster controlled by the first controller;
wherein the transmitter is further configured to send a first control request to the first controller, the first control request for requesting first controller to manage the AP;
wherein the receiver is further configured to receive a network address of a first forwarding device that is sent by the first controller; and
wherein the transmitter is further configured to send user data to the first forwarding device according to an instruction of the first controller.

15. An access point (AP), comprising:
a transmitter configured to send a first control request to a first controller, the first control request for requesting the first controller to manage the AP; and
a receiver, configured to receive a network address of a first forwarding device that is sent by the first controller; and send user data to the first forwarding device according to an instruction of the first controller,
wherein the transmitter is further configured to report radio resource (RR) information to the first controller, wherein the RR information comprises a quantity of stations associated with the AP and a data load of the AP; and
a processor, configured to skip, under an instruction of the first controller, establishing an association with a station, except an associated station, that is located in an overlapping coverage area of the AP and a neighboring AP of the AP, wherein the instruction of the first controller is delivered to the AP when the quantity of stations associated with the AP exceeds a second predefined quantity and/or when the data load of the AP exceeds a first predefined load.

16. The AP according to claim 15, wherein:
the processor is further configured to:
according to an instruction delivered by the first controller when load on the first controller exceeds a second predefined load, exit from an AP cluster controlled by the first controller and enter an AP cluster controlled by a second controller, wherein a load on the second controller does not exceed the second predefined load.

* * * * *